United States Patent
Weissmann et al.

(10) Patent No.: US 12,525,326 B2
(45) Date of Patent: Jan. 13, 2026

(54) PERSONALIZED TREATMENT TOOL

(71) Applicant: Roche Diabetes Care, Inc., Indianapolis, IN (US)

(72) Inventors: Joerg Weissmann, Mannheim (DE); Elena Acmet, Monza (IT); Francesco Giorgino, Bari (IT)

(73) Assignee: ROCHE DIABETES CARE, INC., Indianapolis, IN (US)

( * ) Notice: Subject to any disclaimer, the term of this patent is extended or adjusted under 35 U.S.C. 154(b) by 717 days.

(21) Appl. No.: 17/281,094

(22) PCT Filed: Oct. 8, 2019

(86) PCT No.: PCT/EP2019/077201
§ 371 (c)(1),
(2) Date: Mar. 29, 2021

(87) PCT Pub. No.: WO2020/074500
PCT Pub. Date: Apr. 16, 2020

(65) Prior Publication Data
US 2022/0101973 A1    Mar. 31, 2022

(30) Foreign Application Priority Data
Oct. 8, 2018    (EP) .................................... 18199132

(51) Int. Cl.
*G16H 20/10* (2018.01)
*G16H 20/70* (2018.01)

(52) U.S. Cl.
CPC ............. *G16H 20/10* (2018.01); *G16H 20/70* (2018.01)

(58) Field of Classification Search
CPC ........ G16H 20/10; G16H 20/70; G16H 50/20; A61B 5/4839; A61B 5/7275; A61B 5/14532; A61B 5/4848; A61B 5/7282
See application file for complete search history.

(56) References Cited

U.S. PATENT DOCUMENTS

| 8,818,782 B2 | 8/2014 | Thukral et al. |
| 2009/0006061 A1* | 1/2009 | Thukral ................. G16H 50/20 703/11 |

(Continued)

FOREIGN PATENT DOCUMENTS

| CN | 102763109 | 10/2012 |
| EP | 2 562 664 | 2/2013 |

(Continued)

OTHER PUBLICATIONS

Written Opinion of PCT/EP2019/077201 mailed Apr. 16, 2020.

*Primary Examiner* — Chad A Newton
(74) *Attorney, Agent, or Firm* — Woodard, Emhardt, Henry, Reeves & Wagner, LLP

(57) ABSTRACT

The present invention relates to a computer-implemented method for aiding in the guidance of diabetes drug therapy of an individual suffering from diabetes mellitus. The method is based on glucose data from said individual that are received at a processing unit, wherein said glucose data comprise at least three fasting glucose measurement values from said individual, and/or at least three matched preprandial glucose measurement values and postprandial glucose measurement values at the same meal from said individual. Further contemplated by the present invention is a device for aiding in the guidance of drug diabetes therapy of an individual suffering from diabetes, said device comprising a processing unit, and a computer program including computer-executable instructions, wherein said instructions, when executed by the processing unit, causes the processing unit to perform the computer-implemented method of the present invention.

26 Claims, 12 Drawing Sheets

(56) References Cited

U.S. PATENT DOCUMENTS

| | | | | |
|---|---|---|---|---|
| 2011/0208027 A1* | 8/2011 | Wagner | ................ | G16H 10/40 |
| | | | | 600/365 |
| 2011/0264378 A1* | 10/2011 | Breton | ................ | A61B 5/0002 |
| | | | | 702/19 |
| 2014/0350369 A1 | 11/2014 | Budiman et al. | | |

FOREIGN PATENT DOCUMENTS

| | | |
|---|---|---|
| EP | 2 972 379 | 1/2016 |
| JP | 2005326943 | 11/2005 |
| JP | 2010532044 | 9/2010 |
| JP | 2016508763 | 3/2016 |
| RU | 2008132137 | 2/2010 |
| RU | 2602663 | 11/2016 |
| WO | WO 2011/104616 | 9/2011 |

* cited by examiner

≡ Treatment Tool 🔍 Search ◯ ⌄

Case 39

< Back to patients    Delete patient    Save changes

🔔 Here you can find and edit all the anagraphical and medical
information about your patient Case 39

Personal data

Sex
● Male  ◯ Female

Name                                    Patient code
[ Case ]                                [ CS39 ]

Ethnicity               Surname
                [ Caucasian ]           [ 39 ]             Diabetes duration [ 16 ] years Date of birth                           Weight              Height
[ 05/05/1948 ]                          [ 60 ] kg           [ 170 ] cm

Values

Creatinine (mg/dL)                      Creatinine (μmol/L)
[ 1 ] mg/dL                             [ 88,4 ] (μmol/L)

Last HbA1c recorded (%)                 Last HbA1c record (mmol/mol)
[ 7,4 ] (%)                             [ 57,4 ] (mmol/mol)

Target HbA1c (%)                        Target HbA1c (mmol/mol)
[ 6,5 ] (%)                             [ 47,5 ] (mmol/mol)

Cardiovascular Events ⓘ
◯ No

Setting preprandial and postprandial time slots

Click here to view and change preprandial and postprandial time slots

[ Edit ]

Current diabetes therapy

| Drug | | Dose |
| Alogliptin ⓘ | | 25  mg |

Notes

SMBG data

Insufficient SMBG data!
Last uploaded 04/07/2108

( ✓ PROCEED WITH ASSISTED THERAPY )

Meal glucose excursion threshold  > | 50 | <> | (mg/dL)

Hypoglycemia threshold | 70 | (mg/dL)

n. of hypoglycemia to be tolerated | 1 | (in 30 days)

Setting preprandial and postprandial time slots

Click here to view and change preprandial and postprandial time slots

Edit

SMBG data

Import SMBG values from Excel spreadsheets, or decide to upload data from the SmartPix!

Upload from Excel    Upload from Smartpix

WRITE MANUAL THERAPY    PROCEED WITH ASSISTED THERAPY

PERSONALIZED TREATMENT TOOL

FIELD OF THE INVENTION

The present invention relates to the field of glucose level evaluation and therapy management. More specifically, it relates to a computer-implemented method for aiding in the guidance of diabetes drug therapy of an individual suffering from diabetes mellitus. The method is based on glucose data from said individual that are received at a processing unit, wherein said glucose data comprise at least three fasting glucose measurement values from said individual, and/or at least three matched pre-prandial glucose measurement values and postprandial glucose measurement values from said individual. Further contemplated by the present invention is a device for aiding in the guidance of drug diabetes therapy of an individual suffering from diabetes, said device comprising a processing unit, and a computer program including computer-executable instructions, wherein said instructions, when executed by the processing unit, causes the processing unit to perform the computer-implemented method of the present invention.

BACKGROUND

An aim of modern medicine is to provide personalized or individualized treatment regimens. Those are treatment regimens which take into account a patient's individual needs and risks. A particularly important risk is the presence of diabetes mellitus and its co-morbidities.

The number of people with diabetes has risen from 108 million in 1980 to 422 million in 2014. In 2015, an estimated 1.6 million deaths were directly caused by diabetes. Another 2.2 million deaths were attributable to high blood glucose in 2012. The most frequent reason (type), (about 90%) for diabetes in the world is accounted for by type 2 diabetes having a multifactorial pathogenesis. It is a major cause of blindness, kidney failure, heart attacks, stroke and lower limb amputation.

Individuals suffering from diabetes require access to systematic and organized medical care. The outcome of diabetes can be significantly improved with basic interventions involving medication, lifestyle changes and consistent follow-up. Many individuals suffering from diabetes are treated to a large extent by general practitioners. There is clearly a need for means and methods which aid the general practitioner, as well as the diabetes specialist, in treating the individuals and supporting decisions in terms of diabetes therapy.

The Karlsburg Diabetes Management System KADIS® uses baseline data from a patient such as age, gender, type of diabetes, BMI, food intake and physical exercise, as well as blood glucose data, dosage of insulin and other antidiabetic drugs and calculates a theoretical glucose profile therefrom (see Salzsieder et al., Kadis-Programm. Diabetes aktuell 2012; 10{4}:183-187, or Salzsieder et al., J Diabetes Sci Technol 2007; 1(4):511-521). This is compared to the patient's measured CGM profile (experimental glucose profile). An experienced diabetologist then conducts a weakness analysis of the available data, looking for causes that may explain the difference between theoretical and experimental glucose profiles. Then, by changing and adjusting of the individual metabolic data, a glucose curve is generated that lies to a great extent in the normoglycemic range. The necessary changes, e.g., in the dose of insulin or other anti-diabetic drugs are summarized in a report. The use of the Kadis system thus relies to a considerable extent on a human factor for providing therapeutic guidance.

Simonson et al. (Diabetes Management (2011) 1(2), 175-189) and Nathan et al. (Diabetes Care, Volume 29, Number 8, August 2006, 1963-72) describe algorithms for the management of type 2 diabetes. The algorithms for giving therapeutic advice are mainly based on hemoglobin A1C data. A quantitative analysis of structured SMBG (self-monitoring of blood glucose) data or a comparison of patient data with a database summarizing drug effects is not conducted.

WO 2010/072386 suggests therapy optimization (type of therapy, mono-therapy, oral combination, etc.) as a use case of structured testing methods. A GLP-1 receptor agonist (GLP-1 RA) structured testing procedure is further described which proposes an intensive measurement of blood glucose (bG) values during the time after one or more meals. This allows therapy efficacy to be shown by means of observed reduced postprandial bG values. Based on such observed values, doses recommendation for a GLP-1 RA drug and/or whether a particular GLP-1 RA is the right drug at all for the patient can be determined. An algorithm for making therapy suggestions is not described more specifically.

Therefore, there is a clear longstanding need for means and methods for aiding in the guidance of diabetes drug therapy of an individual who suffers from diabetes. Moreover, the means and methods shall allow a reliable aid in the guidance of diabetes drug therapy. Specifically, they shall allow for the guidance of therapy by a general practitioner and not just for a specialized diabetologist.

Thus, the technical problem underlying the present invention must be seen as the provision of means and methods for complying with the aforementioned needs. The means and methods shall, at the same time, avoid the drawbacks of the prior art referred to above.

The technical problem is solved by the embodiments characterized in the claims and herein below.

Accordingly, the present invention relates to a computer-implemented method for aiding in the guidance of diabetes drug therapy of an individual suffering from diabetes mellitus, said method comprising the steps of
(a) receiving glucose data of said individual at a processing unit, wherein said glucose data comprise at least three fasting glucose measurement values, preferably, from samples of said individual, and/or at least three matched pre-prandial glucose measurement values and post-prandial glucose measurement values, preferably, from samples of said individual,
(b) establishing from a memory one or more of
 (b1) a fasting glucose threshold value,
 (b2) a post-prandial glucose threshold value,
 (b3) a hypoglycemia threshold, and
 (b4) a maximal number of hypoglycemic events to be tolerated,
(c) carrying out by the processing unit an analysis of the individual's glucose measurements values, said analysis comprising one or more of:
 (c1) determining a first statistical parameter indicative for the deviation between the at least three fasting glucose measurement values and the fasting glucose threshold value,
 (c2) determining a second statistical parameter indicative for the deviation between the at least three post-prandial glucose measurement values and the post-prandial glucose threshold value, (c3) determining a Hyperglycemia Prevalence Index (HPI) or a value derived therefrom, wherein the HPI is the ratio of the first statistical parameter as determined in step (c1) to the second statistical parameter as determined in step (c2), (c4) determining the number of hypoglycemic events by comparing the individual's fasting glucose measurement values, pre-prandial glucose measurement values and post-prandial glucose measurement values to the hypoglycemia threshold, and (d) aiding in the guidance of diabetes drug therapy of said individual, wherein said aiding is carried out by the processor unit and is based on the result(s) of the analysis carried out in step c), and on one or more of the following (d1) the effects of at least ten different diabetes drugs on fasting glucose, (d2) the effects of the at least ten different diabetes drugs on postprandial glucose, (d3) the Hyperglycemia Efficacy Indices of the at least ten drugs, wherein the Hyperglycemia Efficacy Index (HEI) for a drug is the ratio of the effect of said drug on fasting glucose to the effect of said drug on the post-prandial glucose, (d4) the risks of causing hypoglycemia of the at least ten diabetes drugs, wherein the effects under (d1), (d2), the indices under (d3) and the risks under (d4) are established from a database for said at least ten diabetes drugs from a memory.

In one embodiment, the invention relates to a method as described above wherein the first and/or second statistical parameter(s) in steps (c1) and/or (c2) being larger than a respective predefined maximum for the first and/or second statistical parameter indicative for a deviation to be tolerated which is established from the memory is indicative for the need to correct hyperglycemia in said individual, wherein a number of hypoglycemic events as determined in step (c4) which is larger than a predefined maximal number of hypoglycemic events to be tolerated by the individual which is established from the memory is indicative for the need to avoid hypoglycemia, and wherein the aid in the guidance comprises the recommendation to change the current diabetes drug therapy if the analysis in step c) indicates that there is a need to avoid hypoglycemia and/or to correct hyperglycemia in said individual, wherein the current diabetes drug is one of the at least ten different diabetes drugs, the processing unit further carries out a comparison of the Hyperglycemia Efficacy Index (HEI) of the current diabetes drug and the HEI value of the remaining drugs established from the database of the memory, and a recommended alternative drug for replacement has the most similar HEI value as the current administered drug; or wherein the aid in the guidance comprises the recommendation to add a further diabetes drug to the therapy if the analysis in step c) indicates that there is a need to correct hyperglycemia, wherein the addition of a diabetes drug out of said at least ten diabetes drugs is recommended which has a HEI value which has the smallest difference to the value of the individual's HPI or the value derived therefrom determined in step (c3).

The method of the present invention is a computer-implemented method. Typically, all steps of the computer-implemented method of the present invention are performed by one or more processing units of a computer or a computer network.

The computer-implemented method of the present invention shall aid in the guidance of diabetes drug therapy of an individual suffering from diabetes mellitus. The term "guidance of diabetes drug therapy" or "guiding diabetes drug therapy" as used herein, preferably, means recommending or deciding whether diabetes drug therapy of an individual suffering from diabetes (such as type 2 diabetes) is changed, or not. Thus, the term refers to making suggestions for therapeutic measures which are specifically applicable to the individual, i.e. whether to change or to continue the current therapy. In an embodiment, the term "guidance of diabetes drug therapy" or "guiding diabetes drug therapy" does not encompass the actual application of the recommended therapeutic or patient health management measure. By carrying out the computer-implemented method of the present invention, an individual can be identified who is in need of a change of diabetes drug therapy, or not. Accordingly, the present invention deals with a method of identifying an individual who is in need of a change of diabetes drug therapy, or not. Typically, an individual who is in need of a change of said therapy will benefit from said change. An individual who benefits from said change, typically, will have a reduced risk of hypoglycemia and/or an improved glycemic control.

As will be understood by those skilled in the art, the assessment made by the method of the present invention is usually not intended to be correct for 100% of the individuals whose therapy shall be guided. The term typically requires that the assessment is correct for a statistically significant portion of the individuals (e.g. a cohort in a cohort study). Whether a portion is statistically significant can be determined without further ado by the person skilled in the art using various well-known statistic evaluation tools, e.g., determination of confidence intervals, p-value determination, Student's t-test, Mann-Whitney test, etc. Details are found in Dowdy and Wearden, Statistics for Research, John Wiley & Sons, New York 1983. Preferred confidence intervals are at least 90%, at least 95%, at least 97%, at least 98% or at least 99%. The p-values are, preferably, 0.1, 0.05, 0.01, 0.005, or 0.0001.

The computer-implemented method of the present invention shall allow for aiding in the guidance of a diabetes drug therapy. It should suggest suitable treatments for the test individual. The treatment suggestions may include alternative therapy suggestions such as replacing the current drug with another drug, increasing the dosage of the currently administered drug, or adding a drug to the currently administered drug or drugs. Also, a list of alternative drugs that can be added to the current drug(s) or that can replace the current drug(s) may be provided. The final decision on the treatment may be made by the attending physician, i.e. by the physician who treats the individual. Thus, the method of the present invention shall aid the attending physician in guiding the therapy of the test individual.

The terms "subject" and "individual" as used herein in the context with the aforementioned method relate to an animal such as a mammal. In an embodiment of the present invention, the individual is a human. The individual whose drug therapy shall be guided shall suffer from diabetes mellitus. In an embodiment, the term "diabetes mellitus" or "diabetes" refers to type 1 diabetes mellitus. In another embodiment, the term "diabetes mellitus" or "diabetes" refers to type 2 diabetes mellitus. The terms "type 1 diabetes mellitus" and "type 2 diabetes mellitus" are well-known in the art.

In type 2 diabetes insulin secretion is inadequate. Often insulin levels are high, especially early in the disease, but peripheral insulin resistance and increased hepatic production of glucose make insulin levels inadequate to normalize plasma glucose levels. Insulin production then falls, further exacerbating hyperglycemia.

The term "diabetes drug therapy" as used herein typically refers to the drug-based treatment of diabetes mellitus such as type 2 diabetes mellitus. In an embodiment, the drug is a diabetes drug which is administered orally or subcutaneously. Typically, the drug is selected from one or more of the following classes of diabetes drugs: biguanides, sulphonylureas, α-glucosidase inhibitors, glinides, dipeptidyl peptidase-4 (DPP-4) inhibitors, SGLT-2 inhibitors, GLP-1 RA, and thiazolidinediones. In an embodiment, the term "diabetes drug" as used herein also encompasses insulin or an insulin analog with extended (basal) or immediate (prandial) activity.

Typical drugs belonging to the above classes are:
biguanides: metformin;
sulphonylurea (SU): glimepiride, gliclazide;
glinides: repaglinide;
α-glucosidase inhibitors: acarbose;
dipeptidyl peptidase-4 (DPP-4) inhibitors: sitagliptin, alogliptin, vildagliptin, saxagliptin, linagliptin;
SGLT-2 inhibitors: empagliflozin, canagliflozin, dapagliplozin;
GLP-1 receptor agonists (GLP-1 RA): liraglutide, exenatide BID, exenatide LAR, dulaglutide, lixisenatide;
thiazolidinediones: pioglitazone.

It is to be understood that the term "diabetes drug therapy" is not limited to the above drugs or drug classes. The term "diabetes drug" shall encompass any drug or combination of drugs which aim to treat diabetes.

Typically, the test individual takes already one or two of the above drugs at the time of the testing (herein referred to as "current drug" or "current drugs"). Alternatively, the test individual can be drug-naïve, i.e. be an individual without prior diabetes drug therapy.

Step a) of the method of the present invention comprises receiving glucose data from samples of the individual at a processing unit.

In an embodiment, said glucose data comprise at least three, i.e. three or more, fasting glucose measurement values from samples of the individual, and at least three, i.e. three or more, matched pre-prandial glucose measurement values and post-prandial glucose measurement values from samples of the individual. It has been shown in the studies of the present invention that three fasting glucose measurement values and three matched pre-prandial glucose measurement values and post-prandial glucose measurement values allow for a sufficient aid in the guidance of diabetes drug therapy. Less than three fasting glucose measurement values and less than three matched values might result in an insufficient guidance.

In a further embodiment of the method of the present invention, said glucose data comprise four to six fasting glucose measurement values from samples of the individual, and four to six matched pre-prandial glucose measurement values and post-prandial glucose measurement values from samples of the individual. This number of values allows for a good guidance of diabetes therapy.

In a further embodiment, said glucose data comprise more than six fasting glucose measurement values from samples of the individual, and more than six matched pre-prandial glucose measurement values and post-prandial glucose measurement values from samples of the individual. This number of values allows for a very good guidance of diabetes therapy.

The glucose data shall be based on measurements in samples that have been obtained from the test individual within a certain period of time. In an embodiment, said samples have been obtained from the individual within a period of at least three days. In another embodiment, the samples have been obtained within a period of about 30 or about 45 days.

The fasting glucose measurement values are, typically, values for the concentration of glucose in fasting blood samples, i.e. values for the fasting blood glucose (FBG) concentration. The matched pre-prandial glucose measurement values and post-prandial glucose measurement values are preferably values for concentration of glucose in at least three matched preprandial and post-prandial blood samples. Thus, the data received in step a) of the method of the present invention, typically, comprise glucose concentration values measured in at least three fasting blood samples and in at least three matched pre-prandial and post-prandial blood samples from said individual. The blood sample may be, e.g., a capillary whole blood sample or a venous blood sample.

The present invention is however not limited to blood samples. In principle, the sample can be also another body fluid sample, such as the interstitial fluid in the subcutaneous adipose tissue, plasma or serum.

As set forth above, the glucose data comprise fasting glucose measurement values, i.e. values measured in fasting samples, such as fasting blood sample. A fasting sample typically is a sample which has been obtained from an individual who refrained from food and beverages, except for water, prior to obtaining the sample to be tested. E.g. the individual refrained from food and beverages, except for water, for at least eight hours prior to obtaining the sample for the fasting glucose measurement value. Also, the sample may have been obtained from the individual after an overnight fast.

The glucose data further comprise at least three matched pre-prandial glucose measurement values and post-prandial glucose measurement values. The term "matched" in this context is well-known in the art. Matched values are values obtained from the same meal, i.e. the pre-prandial value is a value measured in a sample obtained before the meal and the postprandial value is a value measure in a sample after said meal, typically after two hours. The meal can be any meal.

Typically, the method of the present invention does not encompass the measurement of the glucose values. Thus, the expression "receiving glucose data" does not encompass the determination of the amount of glucose in a sample and, in particular, not the drawing of the sample. However, it is to be understood that the measurement of the amount of the biomarker glucose in one or more samples is a prerequisite for carrying out the method of the present invention. The glucose data, in an embodiment, may be received from a storage medium or provided by the individual.

The values shall have been measured by well-known methods and with well-known devices. In an embodiment of the method of the present invention, they have been measured by using a device which allows for the measurement of glucose, in particular blood glucose (such as a blood glucose meter). In an embodiment, the device is self-monitoring blood glucose (SMBG) device, e.g. a blood glucose meter which is used by the test individual for recording the glucose data (which are required for step a).

The glucose data will be typically received by the processing unit by uploading or sending the data from the device to the processing unit. Alternatively, the glucose data can be received by the processing unit by inputting the data via a user interface.

In an embodiment of the present invention, the method of the present invention further comprises step a1) of assessing whether the glucose data received in step a) are sufficient for the aid in the guidance, or not. Said step shall be carried out by the processing unit. If the number of glucose measurement values is insufficient, the processing unit shall provide an alert message on the display that the number of measurement values is insufficient. Alternatively, an audible alarm can be provided by the processor via an indicator, if the number of measurement values is insufficient. As set forth above, it has been shown in the studies underlying the present invention that three fasting glucose measurement values and three matched preprandial glucose measurement values and post-prandial glucose measurement values allow for a sufficient aid in the guidance of diabetes drug therapy. Less than three fasting glucose measurement values and less than three matched values are typically insufficient for the guidance.

In step b) of the method of the present invention, one or more of the following parameters are established from a memory:
(b1) the fasting glucose threshold value
(b2) the post-prandial glucose threshold value
(b3) the individual's hypoglycemia threshold, and
(b4) the maximal number of hypoglycemic events to be tolerated by the individual.

Accordingly, the processing unit retrieves one or more of the above parameters from the memory. In an embodiment, all four parameters are established, i.e. retrieved from a memory.

The fasting glucose threshold value as set forth under b1) typically is the upper limit of the normal range for fasting glucose value, i.e. the value of glucose in a fasting sample of the healthy, non-diabetic individual. The value is typically a default value for all tested individuals. In an embodiment, the value is a concentration of about 100 mg/dl glucose.

The post-prandial glucose threshold value as set forth under b2) typically is the upper limit of the normal range for post-prandial glucose value, i.e. the value of glucose in a post-prandial sample from the healthy, non-diabetic individual. The value is typically a default value for all tested individuals. In an embodiment, the value is a concentration of about 140 mg/dl glucose.

The individual's hypoglycemia threshold as set forth under b3) is a value for a reference concentration (of glucose) which allows for the diagnosis of a hypoglycemic event in said individual. If value for a glucose measurement from the individual as received in step a) of the above method is lower than the individual's hypoglycemia threshold than the individual has suffered from a clinically relevant hypoglycemic event. If two of the values received in step a) are below said threshold than the individual has suffered from two clinically relevant hypoglycemic events. The threshold may depend on individual factors or the medical history of the individual. However, the value may be also a default threshold for all tested individuals. In an embodiment, the threshold is a concentration below 70 mg/dl glucose. In another embodiment, the threshold is a concentration of about 70 mg/dl glucose.

The maximal number of hypoglycemic events to be tolerated by the individual as set forth under b4) is the maximal number of events that may occur in the tested subject within a predefined period such as a period of about 30 or about 45 days. The number may depend on individual factors or the medical history of the individual. For example, younger individuals tolerate hypoglycemic episodes better than older individuals. However, the number may be also a default number for all tested individuals. In an embodiment, the maximal number is 0 (zero), i.e. no hypoglycemic events are allowed. In another embodiment, the maximal number is 1.

All values, thresholds or numbers established in step b) can be set individually for the individual or can be set for all tested subjects (as default). In accordance with the method of the present invention, they can be derived also from the individual's medical records.

In an embodiment of the method of the present invention, step b) may further comprise establishing from the memory information on one or more of:
the individual's current drug diabetes therapy, preferably on the drug(s) in use and on the dosage of said drug(s);
the individual's name, age, sex, and/or ethnicity;
the individual's weight (Kg) and/or obesity;
the individual's height (cm);
the individual's creatinine level and/or estimated glomerular filtration rate;
the individual's history of cardiovascular disease;
the individual's history of kidney disease;
the individual's last HbA1c value recorded;
the individual's target HbA1c.

It will be understood that this further information may also affect the selection of specific drugs, in particular for individual suffering from obesity (i.e., BMI>30), having a cardiovascular disease and/or diabetic kidney disease, being older than 75 years, and/or having renal insufficiency (i.e. eGFR<60).

Further, information on the costs of the at least ten drugs may be established from the memory.

In step (c) of the method of the present invention, an analysis of the individual's glucose measurements values received in step a) is carried out. Said analysis may comprise one or more, typically, all of the following steps:
(c1) determining a first statistical parameter indicative for the deviation between the at least three fasting glucose measurement values and the fasting glucose threshold value,
(c2) determining a second statistical parameter indicative for the deviation between the at least three post-prandial glucose measurement values and the post-prandial glucose threshold value,
(c3) determining a Hyperglycemia Prevalence Index (HPI), or in an embodiment a value derived therefrom, wherein the HPI is the ratio of the first statistical parameter as determined in step (c1) to the second statistical parameter as determined in step (c2),
(c4) determining the number of hypoglycemic events by comparing the individual's fasting glucose measurement values and post-prandial glucose measurement values to the individual's hypoglycemia threshold.

Step (c1) comprises determining a first statistical parameter indicative for the deviation between the at least three fasting glucose measurement values and the fasting glucose threshold value. In an embodiment, said statistical parameter is the median value of the at least three fasting glucose measurement values. In an embodiment, the difference between the median value of the at least three fasting glucose measurement values and the fasting glucose value threshold is calculated by the processing unit. The step may thus also comprise the determination, i.e. the calculation of the median value of the at least three fasting glucose measurement values. In another embodiment, the statistical parameter may be the median value of the deviations between each of the at least three glucose measurement values and the fasting glucose threshold value. The step, thus, may comprise calculating the deviations a first and subsequently determining the median value for the said deviations.

Instead of median as referred to herein, in general, also mean or any parameter or value derived therefrom can be used.

Step (c2) comprises determining a second statistical parameter indicative for the deviation between the at least three post-prandial glucose measurement values and the post-prandial glucose value threshold. In an embodiment, said second statistical parameter is the median value of the at least three post-prandial glucose measurement values. In an embodiment, the difference between the median value of the at least three post-prandial glucose measurement values and the upper threshold of post-prandial glucose value is calculated by the processing unit. The step may thus also comprise the determination, i.e. the calculation of the median value of the at least three post-prandial glucose measurement values. In another embodiment, the statistical parameter may be the median value of the deviations between each of the at least three post-prandial glucose measurement values and the post-prandial glucose threshold value. The step, thus, may comprise calculating the deviations a first and subsequently determining the median value for the said deviations.

Step (c3) comprises determining a Hyperglycemia Prevalence Index (HPI), wherein the HPI is the ratio of the first statistical parameter as determined in step (c1) to the second statistical parameter as determined in step (c2). The ratio as used herein, in general, refers to any mathematical relationship between the first and second statistical parameters indicative for the proportion of these parameters to each other, e.g., the ratio may be a quotient, rate, proportion or any parameter or value derived therefrom. In an embodiment, the value derived from the HPI is a value obtained by multiplying the HPI with a scaling factor. The scaling factor, in an embodiment is less than 1, in an embodiment is of from 0.5 to 0.9, in a further embodiment is of from 0.6 to 0.8, in a further embodiment is about 0.7, in a further embodiment is 0.7. As the skilled person understands, the effect of scaling the HPI may in an embodiment as well be achieved by other standard mathematical operations known to the skilled person, e.g. by scaling the first statistical parameter determined in step (c1) or by scaling the second statistical parameter determined in step (c2) with the inverse of the scaling factor. Moreover, in an embodiment, instead of scaling the HPI, equivalent measures may be taken, e.g. scaling of the HEI values in the database before comparison to the HPI.

Step (c4) comprises determining the number of hypoglycemic events by comparing the individual's fasting, pre-prandial and post-prandial glucose measurement values to the individual's hypoglycemia threshold. Thus, each of the at least three fasting glucose measurement values and each of the at least three pre-prandial and post-prandial glucose measurement values is compared to the individual's hypoglycemia threshold. The number of values below said threshold is determined, i.e. calculated by the processing unit. Each value which is lower than said threshold indicates a hypoglycemic event.

Step d) comprises the aid in the guidance of diabetes drug therapy of said individual, wherein said aid is carried out by the processor unit and is based on the results of the analysis carried out in step c), and on one or more of the following
(d1) the effects of at least ten different diabetes drugs on fasting glucose,
(d2) the effects of the at least ten different diabetes drugs on postprandial glucose,
(d3) the Hyperglycemia Efficacy Indices of the at least ten drugs, wherein the Hyperglycemia Efficacy Index (HEI) for a drug is the ratio of the effect of said drug on fasting glucose to the effect of said drug on the post-prandial glucose,
(d4) the risks of causing hypoglycemia of the at least ten diabetes drugs,
wherein the effects under (d1), (d2) and the risk under (d3) are established from a database for said at least ten diabetes drugs from a memory.

The term "effect" as used refers to statistically significant changes in glucose values as specified above elicited by any one the at least ten different drugs (e.g. within a time window of 24 to 26 weeks after onset of therapy).

The term "database" is well known by the skilled person. As used herein, the term refers to an organized collection of data. The database to be used in accordance with the present invention shall comprise information on at least ten different diabetes drugs. In an embodiment, the database comprises the information as specified under (d1), (d2) and (d3), the effects of the at least ten different diabetes drugs on the fasting glucose value, the effects of the at least ten different diabetes drugs on the postprandial glucose value, and the risks of causing hypoglycemia of the at least ten diabetes drugs. As described elsewhere in more detail, the database may further comprise information on (d4) the Hyperglycemia Efficacy Indices for the at least ten drugs.

Preferred diabetes drugs are disclosed elsewhere herein.

In an embodiment of the method of the present invention, the at least ten different diabetes drugs belong to at least five different drug classes. In an embodiment, the five different drug classes are selected from the following eight drug classes biguanides, sulphonylureas, α-glucosidase inhibitors, glinides, dipeptidyl peptidase-4 (DPP-4) inhibitors, SGLT-2 inhibitors, GLP-1 RA, and thiazolidinediones.

In another embodiment of the method of the present invention, the database contains information on effects under (d1), (d2), and the risk under (d4) and optionally the Hyperglycemia Efficacy Indices under (d3) for at least 15 different diabetes drugs. Said drugs may belong to the eight drug classes listed in the previous paragraph.

In another embodiment of the method of the present invention, the database contains information on effects under (d1), (d2), and the risk under (d4) and optionally the Hyperglycemia Efficacy Indices under (d3) for at least 19 different diabetes drugs belonging to the eight drug classes listed above.

In an embodiment of the method of the present invention, the database has been established based on analyzing phase III randomized control trials, i.e. by analyzing the results of phase III randomized control trials for the at least ten different drugs. Such results can be e.g. assessed via scientific publications or regulatory documents which disclose the results for the trials. Suitable scientific publications describing such trials for individual drugs can be, e.g., identified via PubMed. In an embodiment, the trials have assessed large cohorts of diabetes patients such as type 2 diabetes patients and report 7- or 8 point self-monitoring blood glucose data with determinations carried out in the fasting state, in the pre-prandial state and in the post-prandial state. In an embodiment, the trials include only type 2 diabetes patients without major comorbidities.

For establishing the database, the published information on the effects under (d1), (d2), and the risk under (d4) shall be taken into account. The indices under (d3), can be determined based on the published information for the analyzed trials.

The analyzed trials may contain information for monotherapies, i.e. deal only with the administration of a single diabetes drug. However, it is also contemplated that they contain information for combination therapies with two or three drugs of the at least ten drugs. Thus, it is envisaged that the database to be used in step d) contains information on the effects under (d1), (d2), the risk under (d4), and optionally the Hyperglycemia Efficacy Indices under (d3) for monotherapies of the at least ten drugs and for combination therapies with two or three drugs of the at least ten drugs.

The analyzed trials may contain dosage-specific information on the effects under (d1), (d2), and the risk under (d4). Thus, it is envisaged that the database to be used in step d) contains dosage-specific information on the effects under (d1), (d2), the risk under (d4).

As set forth above, the computer-implemented method of the present invention allows for assessing whether a current diabetes drug therapy of an individual who suffers from diabetes shall be changed, or not (i.e. whether the current therapy of said subjects can be continued).

The assessment whether the therapy shall be changed, or not, is preferably based on the results of the analysis made in step c) of the method of the present invention.

Typically, a change in the (current) diabetes drug therapy is recommended, if the analysis in step c) indicates that there is a need to avoid hypoglycemia in said individual and/or if the analysis in step c) indicates that there is a need including simply an opportunity to correct hyperglycemia in said individual.

Also, no change of the (current) diabetes drug therapy is needed, if the analysis in step c) indicates that there is no need to avoid hypoglycemia in said individual and that there is no need to correct hyperglycemia in said individual. Thus, it is recommended to continue the current therapy.

Need to Avoid Hypoglycemia

The assessment as to whether there is a need to avoid hypoglycemia is typically based on the determination as set forth in step c4) of the method of the present invention. According to the present invention, there is a need to avoid hypoglycemia, if the number of hypoglycemic events as determined in step (c4) is larger than the maximal number of hypoglycemic events to be tolerated by the individual. As set forth above, information on the maximal number of hypoglycemic events to be tolerated by the individual shall be established from a memory (see b4).

If an individual has been identified to be in need to avoid hypoglycemia, the change recommended by the method is indicative for a physician for:
  a) a decrease of the dose of a current drug, i.e. of the currently administered drug for the treatment diabetes, or
  b) an replacement of the current drug with an alternative drug.

The alternative drug that shall replace the current drug typically is associated with a lower risk of hypoglycemia as compared to the current drug. Thus, the administration of said alternative drug has a lower risk of hypoglycemia than the administration of the current drug.

Whether an alternative drug has a lower risk of hypoglycemia than the current drug can be assessed by the processing unit based in the information in the database. As set forth above, the database to be used in the method of the present invention contains information on the risk of causing hypoglycemia for each of the at least ten diabetes drugs. In an embodiment, the database contains a ranking for the at least ten drugs, wherein said ranking is based on the risk of causing hypoglycemia of the at least ten diabetes drugs. The ranking is typically a ranking from a lower risk to a higher risk.

The risk may be also expressed as a score, wherein a low score is associated with a low risk, a moderate score with a moderate risk, and a high score with a high risk. Based on the scores, a Hypoglycemia Risk Index can be established.

The ranking, scores, or the Hypoglycemia Risk Index may be displayed on a display. Based on the ranking, an alternative drug which is associated with a lower risk is recommended. In an embodiment, the alternative drug has the same or essentially the same Hyperglycemia Efficacy Index as the current drug (as described elsewhere herein).

If the determination in step c) carried out by the processing unit indicates that there is no need to avoid hypoglycemia, i.e. if the number of hypoglycemic events is equal to or lower than the maximal number of hypoglycemic events to be tolerated by the individual, then there is no need to decrease the dose of a current drug and to replace the current drug with an alternative drug which is associated with a lower risk of hypoglycemia as compared to the current drug. However, the processing unit will assess whether there is a need to correct hyperglycemia in the individual.

In an embodiment, the alternative drug, i.e. the drug which is recommended to replace the current drug, has the same or essentially the same Hyperglycemia Efficacy Index (HEI) as the current administered drug. Thus, the recommendation may also take into account the HEI as described elsewhere herein in more detail.

Need to Correct Hyperglycemia

The Assessment as to Whether there is a Need to Correct Hyperglycemia is Typically Based on the determination carried out in steps c1) and c2) of the method of the present invention. If the results of the determination carried out in steps c1) and c2 indicate that there is a need including simply an opportunity to correct hyperglycemia, a change of the diabetes drug therapy is recommended. Which change of diabetes therapy is recommended might dependent on further factors and might require further steps (e.g. steps c3) and c5) as described herein below).

In an embodiment, there is a need including simply an opportunity to correct hyperglycemia, if according to the analysis
  in step c1) the median value of the at least three fasting glucose measurement values is larger than the fasting glucose reference value, and/or
  in step c2) the median value of the at least three post-prandial glucose measurement values is larger than the post-prandial glucose reference value.

In another embodiment, there is a need to correct hyperglycemia, if according to the analysis
  in step c1) the deviation, i.e. the difference, between the median value of the at least three fasting glucose measurement values and the fasting glucose threshold value is larger than a threshold (for the deviation in c1), and/or
  in step c2 the deviation, i.e. the difference, between the median value of the at least three post-prandial glucose measurement values and the post-prandial glucose threshold value is larger than a threshold (for the deviation in c2).

The first statistical parameter indicative for the deviation in step c1) is typically calculated by subtracting the fasting glucose threshold value from the median value of the at least three fasting glucose measurement values (i.e. by carrying out the following calculation: "median value of the at least three fasting glucose measurement values" minus "the fasting glucose threshold value"). As set forth above, the fasting glucose threshold value shall be established from a memory.

Thus, the deviation calculated in step c1) is the excess fasting glucose value. If said value is larger than the threshold, there is a need including simply an opportunity to correct hyperglycemia.

The second statistical parameter indicative for the deviation in step c2) is typically calculated by subtracting the post-prandial glucose threshold value from the median value of the at least three post-prandial glucose measurement values (i.e. by carrying out the following calculation: "median value of the at least three post-prandial glucose measurement values" minus "the post-prandial glucose threshold value"). As set forth above, the post-prandial threshold glucose value shall be established from a memory.

Thus, the deviation calculated in step c2) is the excess post-prandial glucose value. If said value is larger than the threshold, there is a need including simply an opportunity to correct hyperglycemia.

The thresholds to be applied in steps c1) and c2) may be predetermined thresholds. The values for the thresholds are typically established from a database as well.

In an embodiment, the threshold applied in step c1) is at least 25 mg/dl for difference between median fasting glucose value and fasting glucose threshold value. This threshold (25 mg/dl for fasting glucose values) is determined from clinical practice to be clinically significant to start some therapy changes.

For example, the fasting glucose threshold value (b1) is 100 mg/dl. The median value of the at least three fasting glucose measurement values is 130 mg/dl. The predetermined threshold for the deviation in step c1) is 25 mg/dl. The difference as determined in step c1) is thus 30 mg/dl (130 minus 100 mg/dl). Since the difference is larger than the threshold for the deviation in step c1), there is a need including simply an opportunity to correct fasting hyperglycemia.

In an embodiment, the threshold for the deviation in step c2) is at least 20 mg/dl for difference between median post-prandial glucose measurement values and post-prandial glucose threshold value. This threshold (20 mg/dl) for postprandial glucose values is determined from clinical practice and it is clinically significant to start some therapy changes evaluation. For this reason, in all cases, if median postprandial glucose value minus 140 is <20 mg/dl, the value is set to 20 mg/dl for subsequent calculations.

For example, the post-prandial glucose threshold value (b2) is 140 mg/dl. The median value of the at least three post-prandial glucose measurement values is 165 mg/dl. The predetermined threshold for the deviation in step c2) is 20 mg/dl. The difference as determined in step c2) is thus 25 mg/dl (165 minus 140 mg/ml). Since the difference is larger than the threshold for the deviation in step c2), there is a need including simply an opportunity to correct hyperglycemia.

If an individual has been identified by the method of the present invention to be in need to correct hyperglycemia, the change of the drug diabetes therapy recommended by the method is preferably one or more of the following:
  (a) an increase of the dose of the current diabetes drug,
  (b) the addition of a further diabetes drug to the therapy of the individual,
  (c) the replacement of one or more currently administered drugs with one or more alternative drugs.

Further, the recommended change may be:
  (d) the addition of prandial or basal insulin to the therapy of the individual or a fixed ratio combination of basal insulin and GLP-1RA.

The final decision, whether (a), (b), or (c), or whether (a), (b), (c), or (d) is recommended may be made by the attending physician. Thus, all options may be displayed. For dose changing, the physician can modify the dose directly by changing the figure already displayed. For drug replacement, or drug addition, a list of recommended drugs can be displayed. Based on the list, the decision on drug can be made. In an embodiment, the drug in use, the prohibited associations of drugs, and/or drugs that are contraindicated according to the patient's eGFR are omitted from the list of recommended drugs.

Which specific drug is recommended in step d) is typically based on further determinations carried out by the processing unit. Thus, further factors are taken into account for the guidance of the therapy.

As set forth above, step c3) comprises the determination of the Hyperglycemia Prevalence Index (HPI), or in an embodiment a value derived therefrom, wherein the HPI is the ratio of the deviation determined in step (c1), in particular the excess fasting glucose value, to the deviation determined in step (c2), in particular the excess post-prandial glucose value. The HPI is an indication for the prevalence of hyperglycemia in the individual subject with diabetes.

Thus, a ratio is calculated. In the following, an Example is given:
  median fasting glucose value: 160 mg/dl
  median post-prandial glucose value: 210 mg/dl
  Hyperglycemia Prevalence Index=(median FBG−100)/(median PPBG−140)=60/70=0.857, in an embodiment the mean PPBG may be used instead of the median PPBG, and/or the mean FBG may be used instead of the median FBG. Also, in an embodiment, the HPI may be multiplied with a scaling factor, e.g. 0.7.

Thus, the calculated ratio, i.e. the HPI, is 0.857.

As described herein below, the determination carried out in step c3) is not required for all individuals who have been identified to be in need for correction of hyperglycemia. However, if the step is taken into account, the ratio calculated in this step is used for the guidance in step d) of the method of the present invention. In particular, the recommendation of the change of the therapy is based on the HPI, or in an embodiment a value derived therefrom, and the Hyperglycemia Efficacy Indices for the at least ten drugs in the database. In addition to:
  (d1) the effects of at least ten different diabetes drugs on the fasting glucose value,
  (d2) the effects of the at least ten different diabetes drugs on the post-prandial glucose value, and
  (d4) the risks of causing hypoglycemia of the at least ten diabetes drugs, the database may further comprise information on:
  (d3) the Hyperglycemia Efficacy Indices for the at least ten drugs.

Preferably, the effects under (d1), (d2), the risk under (d4), and the Hyperglycemia Efficacy Indices under (d3) are established from a database for said at least ten diabetes drugs from a memory.

For assessing which change of the diabetes drug therapy is to be recommended (in case the results of the determination carried out in steps c1) and/or c2) indicate that there is a need to correct hyperglycemia), the following additional steps are typically carried out:

step (c5) of determining the mean meal glucose excursion value, wherein the mean meal glucose excursion value is the mean value of the difference between the post-prandial measurement value and the pre-prandial blood measurement value for the at least three matched pre-prandial and post-prandial measurement values at the same meal, and determining the deviation between the mean meal glucose excursion value and a glucose excursion threshold.

The glucose excursion threshold to be applied is typically established from the memory. Thus, step b) of the method of the present invention may further comprise establishing (b5) the glucose excursion threshold from the memory.

The glucose excursion threshold as set forth under b5) is a reference value which allows for the diagnosis of an excessive glucose excursion. The term "glucose excursion" refers to the difference between post-prandial and pre-prandial glucose values at the same meal, e.g. blood glucose values of the individual. An excessive glucose excursion after intake of a meal requires a correction of the treatment. The glucose excursion threshold is typically the maximal tolerated glucose excursion. If the mean meal glucose excursion value as determined in step c5) is larger than the threshold b5), there is an excess glucose excursion. If the mean meal glucose excursion value as determined in step c5) is lower than the threshold b5), there is not an excess glucose excursion. The threshold may depend on individual factors or the medical history of the individual. However, the value may be also a default threshold for all tested individuals. In an embodiment, the individual's glucose excursion threshold is a value of 50 mg/dl glucose. In another embodiment, the threshold is a value of about 60 mg/dl glucose.

For example, the glucose excursion threshold b5) is 60 mg/dl. In an embodiment, the glucose excursion threshold b5) is 50 mg/dl. The mean meal glucose excursion value as determined in step c5) is 70 mg/dl. Thus, the processing unit will assess that there is an excess glucose excursion because the mean meal glucose excursion value is larger than the threshold.

In an embodiment, the Hyperglycemia Efficacy Index (HEI) for a drug is the ratio of the effect of said drug on fasting glucose to the effect of said drug on post-prandial glucose (i.e. the effect under (d1) and the effect under (d2)). In an embodiment, drugs belonging to the same drug class have the same HEI.

In an embodiment the change of the therapy recommended in step d) is based on the comparison of the individual's Hyperglycemia Prevalence Index (HPI), or in an embodiment a value derived therefrom, as determined in step c3) and the Hyperglycemia Efficacy Index (HEI) of the drugs or of the drug classes. As set forth above, information in the HEI of the drugs or the drug classes is present in the database to be used in step d).

In case of drug addition, the recommendation of the drug to be added is typically based on the difference between the individual's Hyperglycemia Prevalence Index (HPI), or in an embodiment a value derived therefrom, and Hyperglycemia Efficacy Index of the drugs in the database. Preferably, the HEI of the recommended drug to be added corresponds to the individual's HPI as determined in step c3). Thus, a drug is recommended whose HEI has the smallest difference to the individual's HPI, or in an embodiment the value derived therefrom. Further, a list of alternative drugs to be added may be provided. In an embodiment, the list is displayed on a display. In the list, the drugs are typically ranked based on the difference of the drug's HEI to the individual's HPI, or in an embodiment the value derived therefrom. In an embodiment, the drugs are ranked from the smallest difference to the highest difference. The final decision of the drug to be added can be made by the attending physician. The Hypo Risk Index of the drugs may be also displayed.

In case of drug replacement, the recommendation of the drug which shall replace the current drug is typically based on a comparison of the HEI of the current drug and the HEI of the drugs or drug classes in the database. Thus, the method of the present invention may comprise a step of comparing the HEI of the current drug with the HEI of the drugs or drug classes in the database. In an embodiment, a replacement drug is recommended whose HEI has the smallest difference to HEI of the current drug. Further, a list of alternative drugs to replace the current drug may be provided. In an embodiment, the list is displayed on a display. In the list, the drugs are typically ranked based on the difference of the HEI of the listed drugs to the HEI of the current drug. In an embodiment, the listed drugs are ranked from the smallest difference to the highest difference. The final decision of the drug which shall replace the current drug can be made by the attending physician. The Hypo Risk Index of the drugs may be also displayed.

In the following, examples for the recommendation of the therapy of an individual who has been identified (based on step (c1) and/or (c2)) to be in need for a correction of hyperglycemia is provided. Typically, the recommendation is based on the calculations carried out in step (c3) and/or step (c4).

Example A) A diabetes drug selected from Lixisenatide, Exenatide and a Dipeptidyl peptidase-4 inhibitor is recommended, if, according to step c5), there is an excessive glucose excursion (e.g. of larger than 50 mg/dl), and if according to step c1), there is moderate deviation between the median value of the at least three fasting glucose measurement values and the fasting glucose threshold value, regardless of the deviation calculated in step c2). This case does also not require the determination described in step c3) of the method of the present invention.

In an embodiment, a moderate deviation between the median value of the at least three fasting glucose measurement values and the fasting glucose threshold value, is preferably a deviation of lower than about 35 mg/dl, lower than about 45 mg/dl, i.e. the excess fasting glucose value lower than about 35 mg/dl, or lower than 45 mg/dl. In another embodiment, a moderate deviation is a deviation of lower than about 40 mg/dl.

Example B) If, according to step c5), there is an excessive glucose excursion (e.g. of larger than 60 mg/dl), and if according to step c1), there is high deviation between the median value of the at least three fasting glucose measurement values and the fasting glucose threshold value, the recommendation is based on the determination described in step c3). Thus, the Hyperglycemia Prevalence Index is determined. The recommendation described in this section (B).

In an embodiment, a high deviation between the median value of the at least three fasting glucose measurement values and the fasting glucose threshold value, is preferably a deviation of larger than about 35 mg/dl, or larger than 45 mg/dl, i.e. the excess fasting glucose value is larger than about 35 mg/dl, or larger than 45 mg/dl. In another embodiment, a high deviation is a deviation of larger than about 40 mg/dl.

The recommendation of the drug to be added is typically based on the comparison of the individual's HPI, or in an embodiment a value derived therefrom, and the HEI of the drugs and the drug classes as described above.

Alternatively, the current drug may be replaced. In this case, it is not required to determine the individual's HPI. The recommendation of the drug which shall replace the current drug is typically based on the comparison of the HEI of the current drug and the HEI of the drugs and the drug classes as described above.

In an embodiment, the aid in the guidance (according to step d) of the method of the present invention) is provided via a display, configured for presenting the aid in the guidance. Here, the recommended treatment may be shown, e.g. whether the therapy shall be continued, or changed. As described elsewhere herein, various alternative treatments and/or alternative drugs may be recommended. In this case, the alternative treatment options may be shown in the display. If alternative drugs are recommended, further information on the drugs which could support the decision of the attending physician on the treatment such as the HEI or the Hypoglycemia Risk Index of the drugs may be shown. Also, a ranking of the drugs can be provided.

In an embodiment of the method of the present invention, the method may comprise the further step of transferring the information on the guidance made in step d) of the method of the present invention to the individual's electronic medical records.

Further, the method may comprise the step of electronically issuing a prescription, if a change of the diabetes drug therapy of the individual is recommended. The prescription can be printed by a printer.

In an embodiment of the method of the present invention, an individual who has been identified as being in need for a changed diabetes drug therapy is treated based on the recommended therapy. Thus, the recommended therapy is initiated.

The present invention thus further relates to a method of treating an individual suffering from diabetes, the method comprising, carrying out steps a) to d) of the computer-implemented method of the present invention, thereby identifying an individual who is in need for a change of diabetes drug therapy, and initiating a changed diabetes drug therapy. The method may further comprise the administration of the selected drugs to said individual.

The present invention further relates to computer program including computer-executable instructions for performing the steps of the computer-implemented method according to the present invention of aiding in the guidance of drug diabetes therapy, when the program is executed on a computer or computer network. Typically, the computer program specifically may contain computer-executable instructions for performing the steps of the method as disclosed herein. Specifically, the computer program may be stored on a computer-readable data carrier.

The present invention further relates to computer program product with program code means stored on a machine-readable carrier, in order to perform the method according to present invention, when the program is executed on a computer or computer network, such as one or more of the above-mentioned steps discussed in the context of the computer program. As used herein, a computer program product refers to the program as a tradable product. The product may generally exist in an arbitrary format, such as in a paper format, or on a computer-readable data carrier. Specifically, the computer program product may be distributed over a data network.

The present invention further relates to a computer or computer network comprising at least one processing unit, wherein the processing unit is adapted to perform all steps of the method according to the present invention, in particular steps a), b), c) and d).

Yet, the present invention also contemplates:

A computer or computer network comprising at least one processing unit, wherein said processing unit is adapted to perform the method according to one of the embodiments described in this description, a computer loadable data structure that is adapted to perform the method according to one of the embodiments described in this description while the data structure is being executed on a computer, a computer script, wherein the computer program is adapted to perform the method according to one of the embodiments described in this description while the program being executed on a computer, a computer program comprising program means for performing the method according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, a computer program product having program code means, wherein the program code means can be stored or are stored on a storage medium, for performing the method according to one of the embodiments described in this description, if the program code means are executed on a computer or on a computer network, a data stream signal, typically encrypted, comprising glucose data measurements obtained from the individual as specified herein above, and a data stream signal, typically encrypted, comprising an information providing an aid in the guidance of diabetes drug therapy for said individual as obtained by the method of the invention.

The present invention further relates to a device for aiding in the guidance of drug diabetes therapy of an individual suffering from diabetes, said device comprising a processing unit, and a computer program including computer-executable instructions, wherein said instructions, when executed by the processing unit, causes the processing unit to perform the computer-implemented method according to the present invention, i.e. to perform the steps of said method. In an embodiment, steps a) to d) of the method of the present invention are performed by the processing unit. The device may further comprise a user interface and a display, wherein the processing unit is coupled to the user interface and the display. Typically, the device provides as output the guidance on the drug diabetes therapy. In an embodiment, the guidance is provided on the display.

In the following, particular embodiments are specified:

Embodiment 1: A computer-implemented method for aiding in the guidance of diabetes drug therapy of an individual suffering from diabetes mellitus, said method comprising the steps of
(a) receiving glucose data of said individual at a processing unit, wherein said glucose data comprise at least three fasting glucose measurement values, preferably, from samples of said individual, and/or at least three matched pre-prandial glucose measurement values and post-prandial glucose measurement values, preferably, from samples of said individual,
(b) establishing from a memory one or more of
   (b1) a fasting glucose threshold value,
   (b2) a post-prandial glucose threshold value,
   (b3) a hypoglycemia threshold, and
   (b4) a maximal number of hypoglycemic events to be tolerated,
(c) carrying out by the processing unit an analysis of the individual's glucose measurements values, said analysis comprising one or more of:
   (c1) determining a first statistical parameter indicative for the deviation between the at least three fasting glucose measurement values and the fasting glucose threshold value,
   (c2) determining a second statistical parameter indicative for the deviation between the at least three post-prandial glucose measurement values and the post-prandial glucose threshold value,
   (c3) determining a Hyperglycemia Prevalence Index (HPI), or in an embodiment a value derived therefrom, wherein the HPI is the ratio of the first statistical parameter as determined in step (c1) to the second statistical parameter as determined in step (c2),
   (c4) determining the number of hypoglycemic events by comparing the individual's fasting glucose measurement values, pre-prandial glucose measurement values and post-prandial glucose measurement values to the hypoglycemia threshold, and
(d) aiding in the guidance of diabetes drug therapy of said individual, wherein said aiding is carried out by the processor unit and is based on the result(s) of the analysis carried out in step c), and on one or more of the following
   (d1) the effects of at least ten different diabetes drugs on fasting glucose,
   (d2) the effects of the at least ten different diabetes drugs on postprandial glucose,
   (d3) the Hyperglycemia Efficacy Indices of the at least ten drugs, wherein the Hyperglycemia Efficacy Index (HEI) for a drug is the ratio of the effect of said drug on fasting glucose to the effect of said drug on the post-prandial glucose,
   (d4) the risks of causing hypoglycemia of the at least ten diabetes drugs,
   wherein the effects under (d1), (d2), the indices under (d3) and/or the risks under (d4) are established from a database for said at least ten diabetes drugs from a memory.

Embodiment 2: The method of embodiment 1, wherein in step (b) the target fasting glucose threshold value, the post-prandial glucose threshold value, the hypoglycemia threshold, and the maximal number of hypoglycemic events to be tolerated by the individual are established from the memory, and wherein the analysis in step (c) comprises steps (c1), (c2) and (c3).

Embodiment 3 The method of embodiment 1 or 2, wherein the aid in the guidance is provided via a display configured for presenting the aid in the guidance.

Embodiment 4: The method of any one of embodiments 1 to 3, wherein the aid in the guidance comprises the recommendation to change the current diabetes drug therapy or to continue the current therapy.

Embodiment 5: The method of any of embodiments 1 to 4, wherein a continuation of the current diabetes drug therapy is recommended, if the analysis in step c) indicates that there is no need to avoid hypoglycemia in said individual and that there is no need to correct hyperglycemia in said individual.

Embodiment 6: The method of any one of embodiments 1 to 4, wherein a change of the current diabetes drug therapy is recommended, if i) the analysis in step c) indicates that there is a need to avoid hypoglycemia in said individual, or if ii) the analysis in step c) indicates that there is a need correct hyperglycemia in said individual.

Embodiment 7: The method of any one of embodiments 1 to 6, wherein a number of hypoglycemic events as determined in step (c4) of claim 1 which is larger than a predefined maximal number of hypoglycemic events to be tolerated by the individual which is established from the memory is indicative for the need to avoid hypoglycemia.

Embodiment 8: The method of any one of embodiments 4 to claim 7, wherein the recommended change of the therapy for an individual who has been identified to be in need to avoid hypoglycemia comprises:
   (a) a decrease of the dose of a current diabetes drug, or
   (b) an replacement of a the current diabetes drug with an alternative diabetes drug.

Embodiment 9: The method of any one of embodiments 1 to 8, wherein the current diabetes drug is one of the at least ten different diabetes drugs, the processing unit further carries out a comparison of the risk of the current diabetes drug of causing hypoglycemia and the risks of causing hypoglycemia for the remaining drugs established from the database of the memory, and a recommended alternative drug for replacement of the current drug is associated with a lower risk of hypoglycemia as compared to the current diabetes drug, and wherein optionally the aiding carried out by the processor unit comprises compiling and ranking more than one alternative diabetes drug for replacement of the current diabetes drug based on their risks of causing hypoglycemia.

Embodiment 10: The method of any one of embodiments 1 to 9, wherein the current diabetes drug is one of the at least ten different diabetes drugs, the processing unit further carries out a comparison of the Hyperglycemia Efficacy Index (HEI) of the current diabetes drug and the HEI of the remaining drugs established from the database of the memory, and a recommended alternative drug for replacement has the most similar Hyperglycemia Efficacy Index (HEI) as the current administered drug, and wherein optionally the aiding carried out by the processor unit comprises compiling and ranking more than one alternative diabetes drugs for replacement of the current diabetes drug based on the similarity of their HEI to the HEI of the current diabetes drug.

Embodiment 11: The method of any one of embodiments 1 to 10, wherein the first and/or second statistical parameter(s) in steps (c1) and/or (c2) being larger than a respective predefined maximum for the first and/or second statistical parameter indicative for a deviation to be tolerated which is established from the memory is indicative for the need to correct hyperglycemia in said individual, in particular, wherein
   (i) a first statistical parameter as determined in step c1) which is larger than the fasting glucose threshold value, and/or
   (ii) a second statistical parameter as determined in step c2) which is larger than the post-prandial glucose threshold value, is indicative for a need to correct hyperglycemia in the individual.

Embodiment 12: The method of embodiment 11, wherein the recommended change of the therapy for an individual who has been identified to be in need to correct hyperglycemia comprises one or more of the following
   (i) an increase of the dose of the current diabetes drug,
   (ii) the addition of a further diabetes drug to the current diabetes drug,
   (iii) the replacement of the current diabetes drug with one or more alternative diabetes drugs,
   (iv) the addition of prandial or basal insulin or a fixed-ratio combination of basal insulin and GLP-1RA to the current diabetes drug.

Embodiment 13: The method of embodiments 11 and 12, wherein step (b) of the method of the present invention further comprises establishing (b5) the glucose excursion threshold from the memory, and wherein step (c) further comprises (c5) determining a glucose excursion value, wherein the glucose excursion value is the mean value of the difference between the post-prandial measurement value and the pre-prandial blood measurement value for the at least three matched pre-prandial and post-prandial measurement values at the same meal, and determining the deviation between the mean meal glucose excursion value and the glucose excursion threshold.

Embodiment 14: The method of any one of embodiments 1 to 13, wherein the analysis made by the processor unit in step (c) further comprises determining the individual's Hyperglycemia Prevalence Index (HPI), or in an embodiment a value derived therefrom, wherein the HPI is the ratio of the first statistical parameter as determined in step (c1) to the second statistical parameter as determined in step (c2) and wherein the guidance is based on the results of this analysis step (d3).

Embodiment 15: The method of embodiment 14, wherein the processing unit carries out a comparison of the individual's HPI, or in an embodiment the value derived therefrom, with the Hyperglycemia Efficacy Indices for the at least ten drugs established from the database, wherein, optionally, a comparison with the HEI of the current diabetes drug is excluded.

Embodiment 16: The method of embodiment 15, wherein the addition of a diabetes drug out of said at least ten diabetes drugs is recommended which has a HEI value which has the smallest difference to the value of the individual's HPI, or in an embodiment the value derived therefrom.

Embodiment 17: The method of any one of embodiments 1 to 16, wherein the glucose data received in step (a) comprise at least six fasting glucose measurement values from said individual, and/or at least six matched pre-prandial glucose measurement values and postprandial glucose measurement values from said individual.

Embodiment 18: The method of any one of embodiments 1 to 17, wherein the method further comprises step a1) of carrying out by the processing unit an analysis of whether sufficient glucose data were received in step a) and wherein the method for aiding in the guidance of diabetes drug therapy is automatically terminated without giving guidance of diabetes drug therapy if the received data were not sufficient Embodiment 19: The method of embodiment 18, wherein an alert is made if the number of measurement values is not sufficient Embodiment 20: The method of any one of embodiments 1 to 19, wherein the method further comprises establishing from the memory information on one or more of:
   the individual's current drug diabetes therapy, preferably on the drug(s) in use and on the dosage of said drug(s);
   the individual's name, age, sex, and/or ethnicity;
   the individual's weight (Kg) and/or obesity;
   the individual's height (cm);
   the individual's creatinine level and/or estimated glomerular filtration rate;
   the individual's history of cardiovascular disease and/or diabetic kidney disease;
   the individual's last HbA1c value recorded;
   the individual's target HbA1c.

Embodiment 21: The method of any one of embodiments 1 to 20, wherein the database used in step d) contains information on the risks under (d4), and optionally the Hyperglycemia Efficacy Indices under (d3) for at least 15 different diabetes drugs, said drugs belonging to at least eight different drug classes.

Embodiment 22: The method of embodiment 21, wherein the eight different drug classes are biguanides, sulphonylureas, α-glucosidase inhibitors, glinides, dipeptidyl peptidase-4 (DPP-4) inhibitors, SGLT-2 inhibitors, GLP-1 RA, and thiazolidinediones.

Embodiment 23: The method of any one of embodiments 1 to 22, wherein the database used in step d) has been established based on analyzing phase III randomized control trials for the at least ten different drugs.

Embodiment 24: The method of any one of embodiments 1 to 23, wherein the database used in step d) contains information on the on the risks under (d4) of the at least ten drugs and on at least one of the effects of the at least ten drugs under (d1), the effects of the at least ten drugs under (d2), and the Hyperglycemia Efficacy Indices of the at least ten drugs under (d3).

Embodiment 25: The method of any one of embodiments 1 to 24, wherein the database contains dosage-specific information on one or more or of the effects under (d1), (d2), the Hyperglycemia Efficacy Indices under (d3) and the risks under (d4).

Embodiment 26: The method any one of embodiments 1 to 25, wherein the individual is currently treated with at least one of the at least ten drugs.

Embodiment 27: The method of any one embodiments 1 to 26, wherein the method further comprises establishing from a memory information on the costs of the at least ten diabetes drugs, and wherein the aid in the guidance of the diabetes drug therapy is further based on the costs of the at least ten diabetes medicaments.

Embodiment 28: The method of any of embodiments 1 to 27, wherein the method further comprises predicting, by the processing unit, the probability according to which the recommended therapy, if chosen, will reach the individual's target HbA1c.

Embodiment 29: The method of embodiment 28, wherein the predicted probability is displayed on a display.

Embodiment 30: The method of any one of embodiments 1 to 29, wherein the database comprises information on the effects of the at least ten diabetes medicaments on the weight of a treated subject and wherein the guidance is further based on this information and the current weight status of the individual.

Embodiment 31: The method of embodiment 30, wherein the weight status is determined based on the weight and height of the individual which have been established from a memory.

Embodiment 32: The method of any one of embodiments 1 to 31, wherein information on the guidance made in step d) is automatically transferred to the individual's electronic medical records.

Embodiment 33: The method on any one of embodiments 1 to 32, wherein automatically a prescription is issued electronically, if a change of the diabetes drug therapy of the individual is recommended.

Embodiment 34: The method of embodiment 33, wherein the prescription is printed.

Embodiment 35: The method of any of the previous embodiments, wherein the first and/or second statistical parameter(s) in steps (c1) and/or (c2) being larger than a respective predefined maximum for the first and/or second statistical parameter indicative for a deviation to be tolerated which is established from the memory is indicative for the need to correct hyperglycemia in said individual,
wherein a number of hypoglycemic events as determined in step (c4) which is larger than a predefined maximal number of hypoglycemic events to be tolerated by the individual which is established from the memory is indicative for the need to avoid hypoglycemia, and
wherein the aid in the guidance comprises the recommendation to change the current diabetes drug therapy if the analysis in step c) indicates that there is a need to avoid hypoglycemia and/or to correct hyperglycemia in said individual, wherein the current diabetes drug is one of the at least ten different diabetes drugs, the processing unit further carries out a comparison of the Hyperglycemia Efficacy Index (HEI) of the current diabetes drug and the HEI value of the remaining drugs established from the database of the memory, and a recommended alternative drug for replacement has the most similar HEI value as the current administered drug; or
wherein the aid in the guidance comprises the recommendation to add a further diabetes drug to the therapy if the analysis in step c) indicates that there is a need to correct hyperglycemia, wherein the addition of a diabetes drug out of said at least ten diabetes drugs is recommended which has a HEI value which has the smallest difference to the value of the individual's HPI or the value derived therefrom determined in step (c3).

Embodiment 36: A computer program product stored on a storage medium and configured to perform the method according to any one of embodiments 1 to 35 during operation on a processing unit.

Embodiment 37: A device for aiding in the guidance of drug diabetes therapy of an individual suffering from diabetes, said device comprising a processing unit, and a computer program including computer-executable instructions, wherein said instructions, when executed by the processing unit, causes the processing unit to perform the computer-implemented method of any one of embodiments 1 to 35.

Embodiment 38: The device according to embodiment 37, wherein the device further comprises a user interface and a display, coupled to the processing unit of the device.

Embodiment 39: The device of embodiment 37 or 38, wherein the device provides as output the guidance on the drug diabetes therapy.

All references cited throughout the specification are herewith incorporated by reference in their entirety and with respect to the specifically mentioned disclosure content.

FIGURES

FIG. 2 shows a window which allows for input of personal data as well as health parameters such as creatinine HbA1c, etc.

FIG. 3 shows a window which allows for input of pre-prandial and postprandial time slots as well as the current drug therapy.

Figure 5:
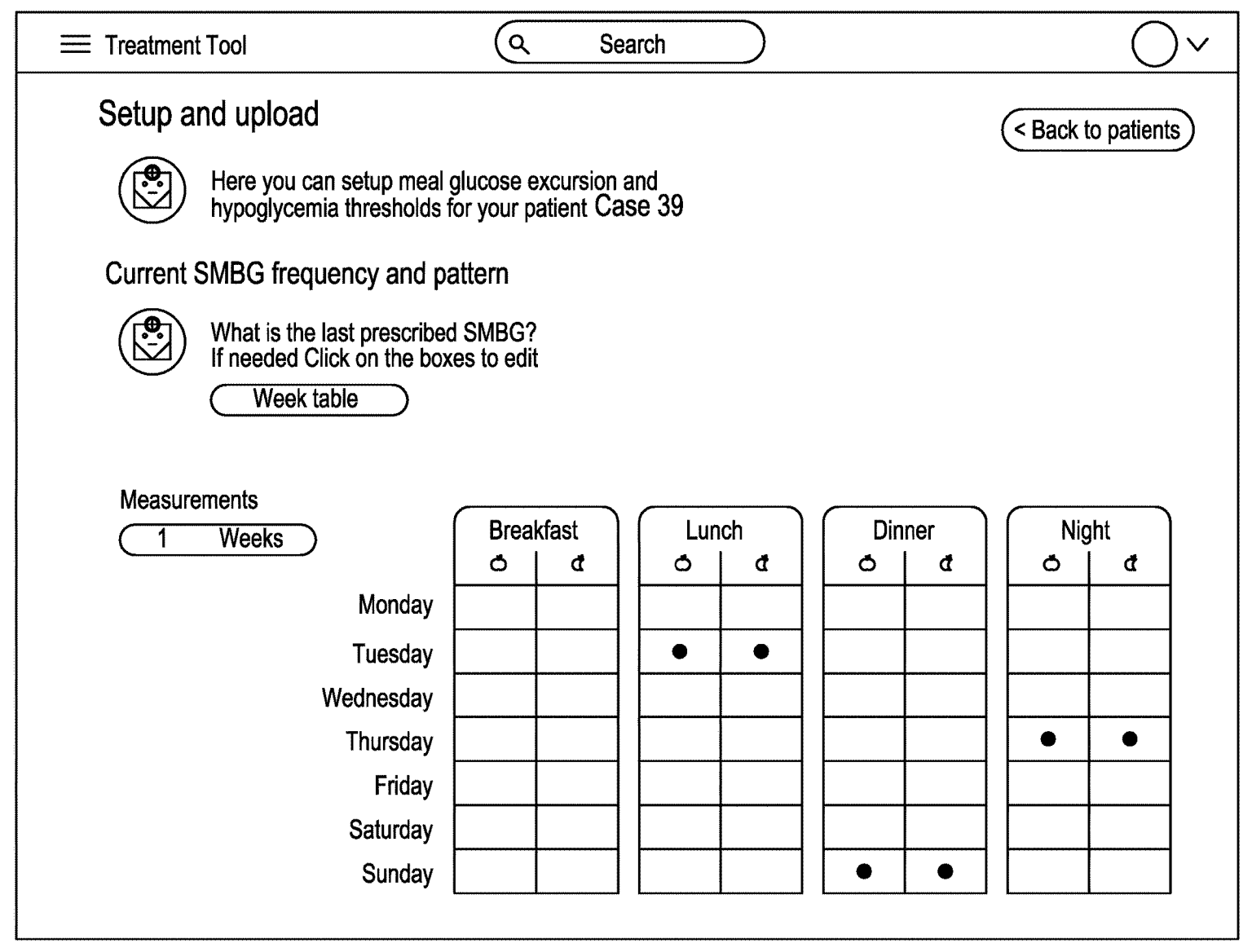

FIG. 5 shows a window which allows displays the SMBG frequency and pattern over a week.

FIG. 6 shows a window which allows for input of meal glucose threshold, hypoglycemia threshold and tolerated hypoglycemia events.

EXAMPLES

Figure 1:
FIG. 1 shows a computer implemented version of the PPT. The window shown represents the main menu allowing for the selection of individual cases.
Figure 4:
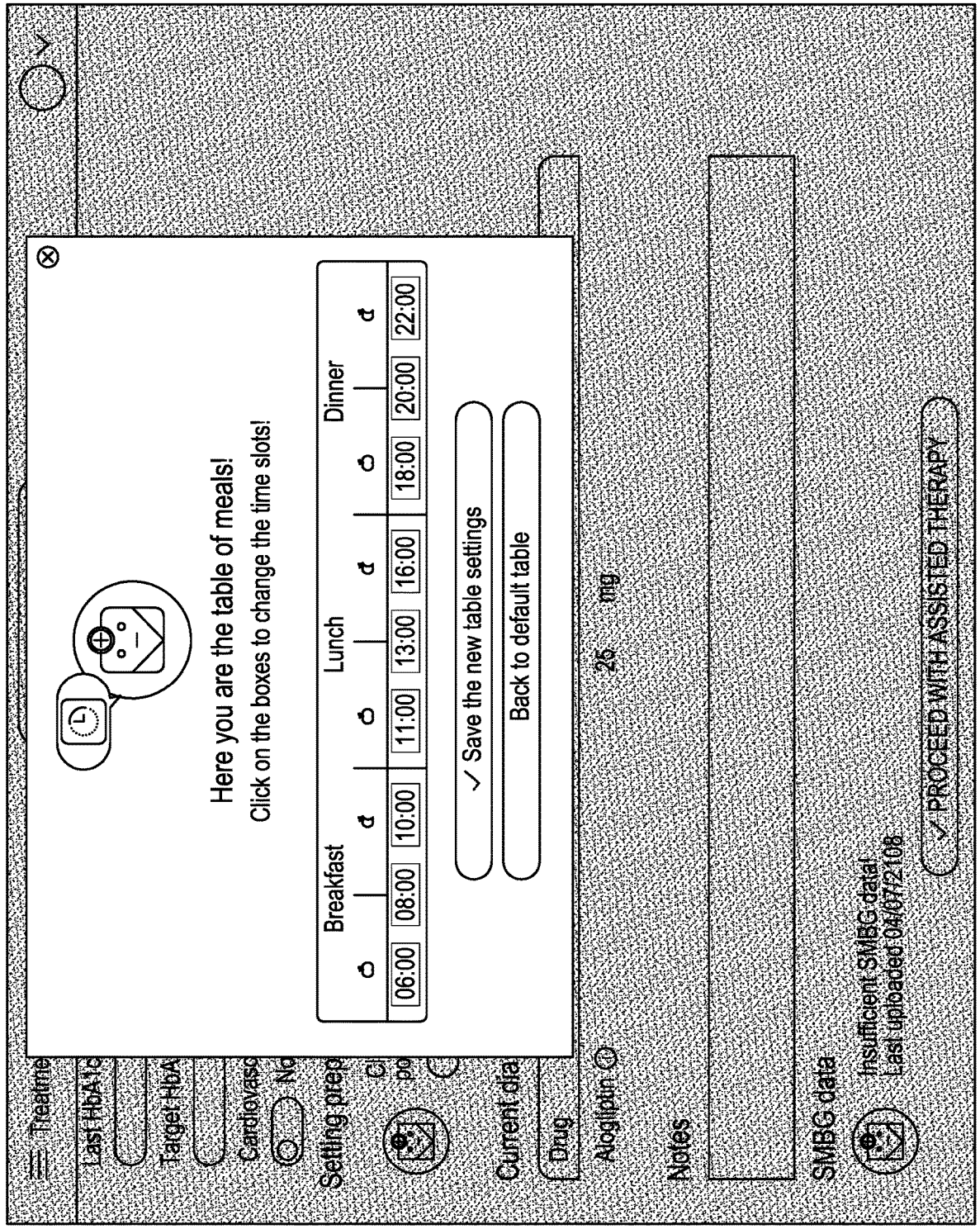
FIG. 4 shows a window which allows for input of meals over the day.
Figure 7:
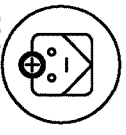
FIG. 7 shows and upload information window.
Figure 8:
FIG. 8 shows a window which allows for input of pre-prandial and postprandial time slots. The window also displays the number of measurements and the percentage of correct measurements.
Figure 9:
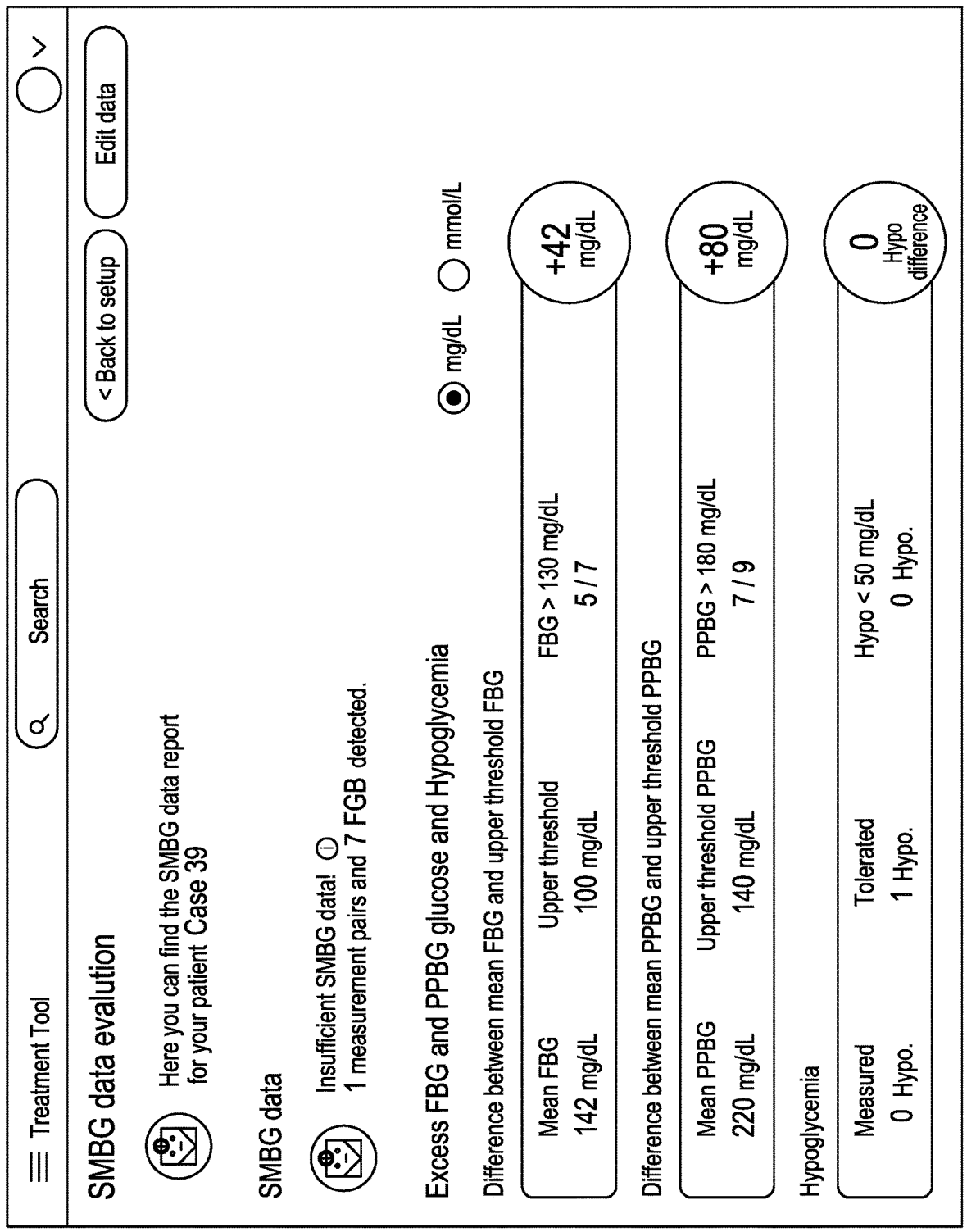
FIG. 9 shows a window which displays the SMBG data evaluation. Indicated are Mean FBG, Upper threshold FBG, mean PPBG, upper threshold PPGB, number of hypoglycemic events as well as maximum number of tolerated hypoglycemic events and calculated are the ratios.
Figure 10:
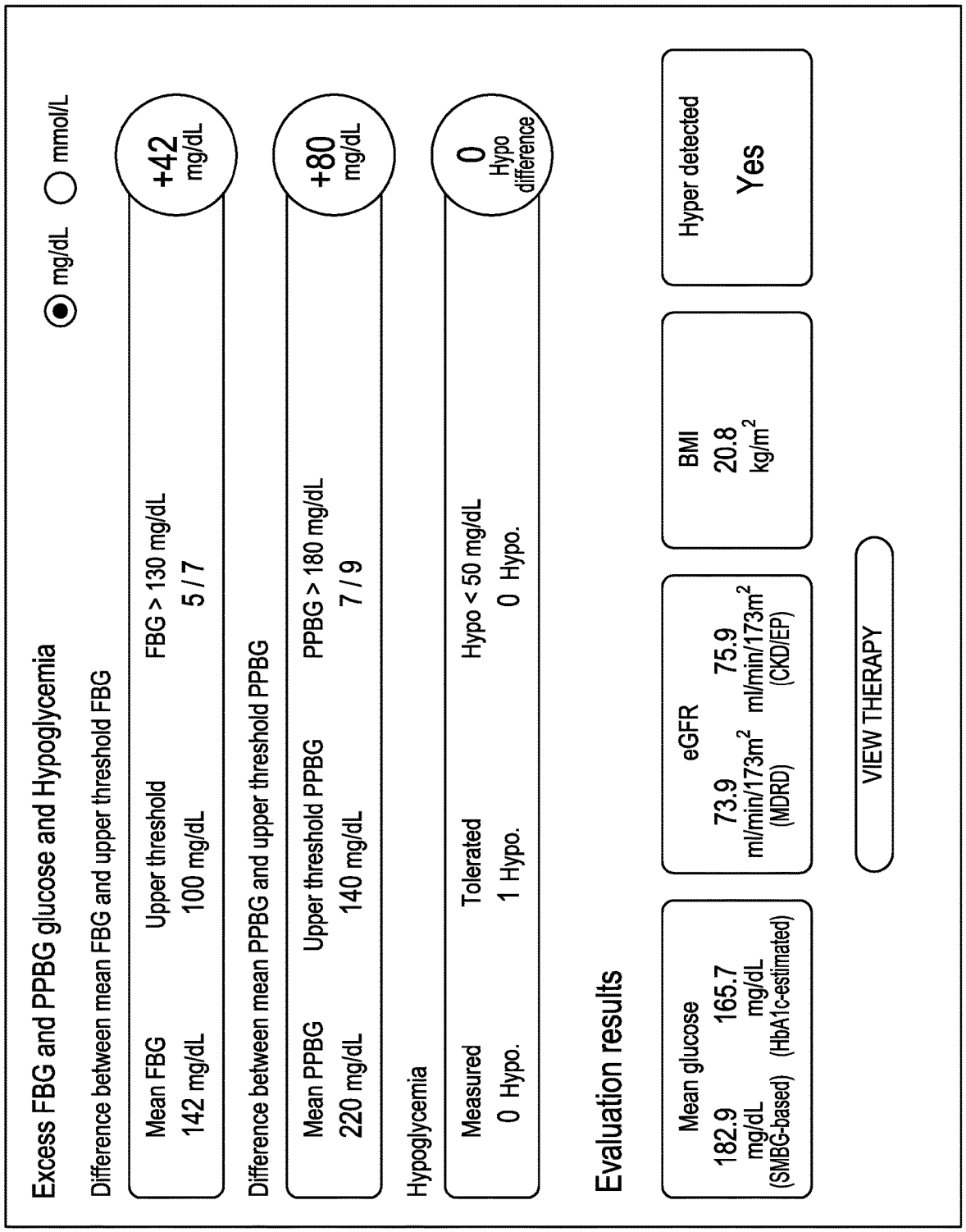
FIG. 10 shows a window similar to FIG. 9. However, the window further displays the aid for diagnosis, i.e. the result (evaluation results) provided by the PPT.
Figure 11:
FIG. 11 shows a window indicating suggestions for therapeutic measures.
Figure 12:
FIG. 12 shows a window suggesting specific drugs and dosages therefor that may be considered by the clinician.

The following Examples shall merely illustrate the invention but shall, whatsoever, not be construed in a sense as to limit the scope of the invention.

Example 1: Personalized Treatment Tool

1. Functions and Prerequisites for a Personalized Treatment Tool (PTT)

The PPT is based on the following functions:
A. It makes use of the knowledge on the efficacy of specific diabetes drugs on fasting glucose (FBG) and postprandial glucose (PPG) levels and considers the risk of hypoglycemia associated with these drugs.
B. It has the capacity to identify abnormalities in glucose levels (in relation to both hyperglycemia and hypoglycemia) in individual patients with type 2 diabetes based on the results deriving from structured self-monitoring blood glucose (SMBG) profiles; this is particularly useful in those patients who are not adequately controlled (i.e. do not reach the HbA1c target) but not limited to these patients.
C. It has implemented an algorithm that can suggest the most effective and safe diabetes drugs for the specific glucose abnormalities found in an individual patient with type 2 diabetes on oral drug and/or basal insulin therapy.

A diabetes drug database relating to the following 19 molecules will be used:

biguanides: metformin; sulphonylurea (SU): glimepiride, gliclazide;

glinides: repaglinide;

α-glucosidase inhibitors: acarbose;

dipeptidyl peptidase-4 (DPP-4) inhibitors: sitagliptin, alogliptin, vildagliptin, saxagliptin, linagliptin;

SGLT-2 inhibitors: empagliflozin, canagliflozin, dapagliplozin;

GLP-1 receptor agonists (GLP-1 RA): liraglutide, exenatide BID, exenatide LAR, dulaglutide, lixisenatide;

thiazolidinediones: pioglitazone.

In addition, the algorithm will consider use of basal insulin and prandial insulin. As new drugs to treat hyperglycemia will become available, they shall be included in the database.

The PIT makes use of software that can analyze structured SMBG data (i.e., SMBG data related to the fasting or pre-prandial phase and 2 h post-prandial time point), determine the frequency of hypoglycemic episodes and determine the pattern of hyperglycemia by:

(i.) evaluating differences between median measured FBG and optimal FBG, in an embodiment between mean measured FBG and optimal FBG, (ii.) evaluating differences between median measured PPG and optimal PPG, in an embodiment between mean measured PPG and optimal PPG (iii.) calculating glucose excursions (i.e., the difference between 2 h post-prandial and pre-prandial glucose levels at the same meal).

2. Tasks Carried Out by Operating PPT (1) In a first step, input and setup data are established as follows:

Personal data—Name, age, sex, ethnicity

Weight (Kg)

Height (cm)

Creatinine (mg/dl and mmol/l)

Cardiovascular disease (yes/no)

Current diabetes therapy (drugs, dose)

Last HbA1c value recorded (% and mmol/mol)

Target HbA1c for the individual patient (% and mmol/mol)—to be set individually

Frequency and pattern of SMBG—provided table can be edited

Structured SMBG data collected over the previous 30 days, in an embodiment 45 days—uploading from other software; the strength of the drug suggestions will depend on the number of values recorded over the period meal glucose excursion threshold—maximal tolerated glucose excursion (pre/post meal) to be set individually; default value is 60 mg/dl, in an embodiment is 50 mg/dl Hypoglycemia threshold—to be set individually; default value is 70 mg/dl no. of hypoglycemia to be tolerated in 4 weeks—to be set individually; default value is 0

(2) Subsequently, the software analyzes the SMBG data over the last period of 30 days, in an embodiment 45 days, and highlights abnormalities in glucose levels (which will be expressed as values and ranges). In particular, the following calculations will be made:

Calculates the difference between mean FBG, in an embodiment median FBG, and threshold FBG (100 mg/dL) to provide information on excess fasting glucose Calculates the difference between median PPG and threshold PPG (140 mg/dL) to provide information on excess postprandial glucose Measures no. of hypoglycemia events in excess vs no. of hypoglycemia events tolerated Calculates mean glucose values based on all SMBG data In all cases, if median FBG−100<25 mg/dl, in an embodiment mean FBG−100<25 mg/dl, the value is set to 25 mg/dl for subsequent calculations; and if median PPG−140<20 mg/dl, in an embodiment mean PPG−140<20 mg/dl, the value is set to 20 mg/dl for subsequent calculations.

(3) The software analyzes the SMBG data over the last period of 30 days, in an embodiment 45 days, and highlights abnormalities in glucose levels (which will be expressed as alerts):

Hypoglycemia detected—if no. of hypoglycemia events measured>no. of hypoglycemia events tolerated→NEED TO AVOID HYPOGLYCEMIA Hyperglycemia detected—if difference between median FBG and threshold FBG (100 mg/dl)>25 mg/dl, in an embodiment between mean FBG and threshold FBG (100 mg/dl)>25 mg/dl, and/or difference between median PPG and threshold PPG (140 mg/dl)>20 mg/dl, in an embodiment between mean PPG and threshold PPG (140 mg/dl)>20 mg/dl→POTENTIAL FOR CORRECTION OF HYPERGLYCEMIA in an embodiment, when excess FBG is <30 mg/dL, the value is set to 30 mg/dL for subsequent calculations; when excess of PPBG is <20 mg/dL, the value is set to 20 mg/dL for subsequent calculations.

(4) The software makes use of the characteristics of diabetes drugs based on review of the scientific literature (phase III studies containing information on 7- or 8-point SMBG; to be updated regularly):

Effects on FBG (as monotherapy, as add-on to other glucose-lowering drugs)

Effects on PPG (as monotherapy, as add-on to other glucose-lowering drugs)

Median ratio of effect on FBG vs effect on PPG (Hyperglycemia Efficacy Index)—drugs from the same class will have the same HEI, and in an embodiment the same Hypoglycemia Risk Index Hypoglycemia risk (Hypo Risk Index)

(5) The software makes suggestions about diabetes drug therapy:

a) if there is NEED TO AVOID HYPOGLYCEMIA 4 software verifies if drug currently used can promote hypoglycemia and suggests a1) to replace the drug with another alternative drug with lower Hypo Risk Index a2) to decrease the dose of current drug The list of suggested drugs is based on the Hypo Risk Index ranking, showing drugs with lower to higher Hypo Risk Index (multiple potential options will be shown) but excluding the drug in use; ranking is also based on the Hyperglycemia Efficacy Index, to first consider those drugs with the most similar Hyperglycemia Efficacy Index to the drug in use. In an embodiment, the software will omit to list: the drug in use, the prohibited associations of drugs, those drugs that are contraindicated according to the patient's eGFR.

b) if there is POTENTIAL CORRECTION OF HYPERGLYCEMIA 4 software verifies if dose of currently used drug used is maximal and suggests b1) to increase the dose of currently used drug, if appropriate b2) to add one or more drugs with specific effect on the hyperglycemia pattern detected b3) to consider replacing one or more drugs b4) to consider adding prandial or basal insulin or fixed-ratio combination of basal insulin and GLP-1RA, if appropriate.

The list of suggested drugs is based on the comparison between the Hyperglycemia Prevalence Index (prevalence of hyperglycemia calculated by dividing the excess fasting glucose level by the excess postprandial glucose level) and the Hyperglycemia Efficacy Index of the drugs:

in case of drug addition, the list of suggested drugs is based on the difference between the Hyperglycemia Prevalence Index (HPI) and Hyperglycemia Efficacy Index from smallest to largest; the Hypo Risk Index is also highlighted (a ranking of multiple potential options will be shown)

in case of drug replacement, the list of suggested drugs is based on the Hyperglycemia Efficacy Index, to first consider those drugs with the most similar Hyperglycemia Efficacy Index to the drug in use (a ranking of multiple potential options will be shown); the Hypo Risk Index is also highlighted (a ranking of multiple potential options will be shown).

If measured post-meal glucose excursion is greater than reference value in the presence of postprandial hyperglycemia (i.e., FBG excess <30 mg/dL and any PPG excess ≥20 mg/dL), in an embodiment the drugs with the highest efficacy on post-meal glucose excursions (i.e., short acting GLP1-RA and DPP-4i) will be shown on the top of the list.

Basal and/or prandial insulin preparations, in an embodiment, are shown at the end of the list of drugs as a default setting because no HEI for insulin is provided.

The software will, in an embodiment, omit to list: the drug in use, the prohibited associations of drugs, those drugs that are contraindicated according to the patient's eGFR.

If, in an embodiment, atherosclerotic cardiovascular disease and/or Heart failure and/or Diabetic kidney disease and/or BMI are relevant (input setting), the software will highlight drug classes with proven cardiovascular, renal and/or weight benefits, as appropriate.

The software lists basal, prandial or biphasic insulin at the end of the list of other drugs, if appropriate.

c) In an embodiment, if there is NEED TO AVOID HYPOGLYCEMIA and POTENTIAL CORRECTION OF HYPERGLYCEMIA→software asks the physician what the priority is:

Need To Avoid Hypoglycemia→the software works as in a)

Potential Correction of Hyperglycemia→the software works as in b)

Need To Avoid Hypoglycemia and Potential Correction of Hyperglycemia at the same time→the software works as follows:

In case of drug replacement, the list of suggested drugs is based on the HRI, from lower to higher (multiple potential options will be shown).

The ranking also considers the HEI, listing those drugs with the most similar HEI to the drug in use first.

In case of drug addition, the list of suggested drugs is based on the difference between the HPI and the HEI, ranked from smallest to largest; the HRI is also highlighted (a ranking of multiple potential options will be shown).

If measured post-meal glucose excursion is greater than reference value in the presence of postprandial hyperglycemia (i.e., FBG excess <30 mg/dL and any PPG excess ≥20 mg/dL) the drugs with the highest efficacy on post-meal glucose excursion (i.e., short acting GLP1-RA and DPP-4i) will be shown on the top of the list.

Basal and/or prandial insulin preparations are shown at the end of the list of drugs as a default setting because no HEI for insulin is provided.

The software will omit to list: the drug in use, the prohibited associations of drugs, those drugs that are contraindicated according to the patient's eGFR.

If Atherosclerotic cardiovascular disease and/or Heart failure and/or Diabetic kidney disease and/or BMI are relevant (input setting) the software will highlight drug class with proven cardiovascular, renal and/or weight benefits, as appropriate.

(6) The software makes use of the input data to highlight the following situations (which will be expressed as alerts) to support the choice of the most appropriate drug for the specific patient:

a) Collection of SMBG data insufficient—If measured glucose values are not sufficiently structured or if they are less numerous than minimum required (less than 3 FBG values, less than 3 paired pre-prandial and post-prandial glucose values from any meal as long as from the same meal, collected over the previous 30 days, in an embodiment 45 days)

sufficient—If measured glucose values are as numerous as minimum required (3 FBG values, 3 paired pre-prandial and post-prandial glucose values from any meal as long as from same meal, collected over the previous 30 days, in an embodiment 45 days)

good quality—if measured glucose values include 4 to 6 FBG values, 4 to 6 paired pre-prandial and post-prandial glucose values from any meal as long as from same meal, collected over the previous 30 days, in an embodiment 45 days very good quality—if measured glucose values include >6 FBG values, >6 paired pre-prandial and post-prandial glucose values from any meal as long as from same meal, collected over the previous 30 days, in an embodiment 45 days.

b) HbA1c
last HbA1c value recorded
target HbA1c c) Mean SMBG value
estimated average glucose value based on last HbA1c measured calculated mean glucose values based on all SMBG data d) Meal glucose excursion
calculated mean glucose excursion
target glucose excursion (i.e., <60 mg/dl, in an embodiment <50 mg/dl)

e) eGFR—calculated automatically according to MDRD and CKD-EPI formulas f) CVD, in an embodiment atherosclerotic cardiovascular disease—if yes or no g) BMI calculated automatically and expressed as
Underweight—below 18.5
Normal—from 18.5 to 24.9
Overweight—from 25 to 29.9
Obese—over 30 h) Age—if >75 years i) In an embodiment, additionally, the following input data may be made use of: Heart failure—yes or no; diabetic kidney disease—yes or no.

Example 2: Simulation of the PPT Tool Algorithm on Clinical Cases

Need to Avoid Hypoglycemia
1. no hypos below the threshold to be tolerated→algorithm verifies if there is a need for correction of hyperglycemia or glucose excursion (see below)
2. hypos above the threshold to be tolerated→first action is hypoglycemia correction and therefore algorithm suggests to
  2a. decrease the dose of currently used drug
  2b. change one or more drugs in use—the list of drugs suggested is based on Hypo Risk Index ranking, from lowest to highest (multiple potential options will be shown)

Potential Correction of Hyperglycemia
A. Glucose excursion >60 mg/dl in the presence of median FBG−100 mg/dl<40 mg/dl, in an embodiment mean FBG−100 mg/dl<40 mg/dl, and any median PPG−140 mg/dl value, in an embodiment any mean PPG−140 mg/dl value→algorithm suggests first of all
Lixisenatide
Exenatide
DPP-4i B. Glucose excursion >60 mg/dl in the presence of median FBG−100 mg/dl≥40 mg/dl, in an embodiment mean FBG−100 mg/dl<40 mg/dl, and any median PPG−140 mg/dl value, in an embodiment any mean PPG−140 mg/dl value→algorithm calculates Hyperglycemia Prevalence Index (HPI) and suggests to add drugs to current therapy according to their Hyperglycemia Efficacy Index (HEI):

Case #1:
FBG: 160 mg/dl
PPG: 210 mg/dl
Preprandial glucose: 145 mg/dl, PPG: 210 mg/dl→Glucose excursion: 65 mg/dl Hyperglycemia Prevalence Index=(median FBG−100)/(median PPG−140)=60/70=0.857
Algorithm suggests drugs with a ranking based on difference between Hyperglycemia Prevalence Index (HPI) and Hyperglycemia Efficacy Index; Hypo Risk Index is also highlighted:

| | | | | |
|---|---|---|---|---|
| ✓ | GLP-1 RA long-acting | Exenatide LAR (2 mg) | HEI 0.76 | HRI 1 - low |
| ✓ | GLP-1 RA long-acting | Liraglutide (1.2 mg) | | HRI 1 - low |
| ✓ | GLP-1 RA long-acting | Liraglutide (1.8 mg) | | HRI 1 - low |
| ✓ | GLP-1 RA long-acting | Dulaglutide (0.75 mg) | | HRI 1 - low |
| ✓ | GLP-1 RA long-acting | Dulaglutide (1.5 mg) | | HRI 1 - low |
| ✓ | Sulphonylurea | Glimepiride (1-8 mg) | HEI 0.69 | HRI 2 - moderate |
| ✓ | Sulphonylurea | Gliclazide (80-320 mg) | | HRI 2 - moderate |
| ✓ | Sulphonylurea | Gliclazide MR (60-90 mg) | | HRI 2 - moderate |
| ✓ | Biguanide | Metformin (≥1000 mg) | HEI 0.59 | HRI 1 - low |
| ✓ | SGLT-2i | Empagliflozin (10 mg) | HEI 0.56 | HRI 1 - low |
| ✓ | SGLT-2i | Empagliflozin (25 mg) | | HRI 1 - low |
| ✓ | SGLT-2i | Canagliflozin (100 mg) | | HRI 1 - low |
| ✓ | SGLT-2i | Canagliflozin (300 mg) | | HRI 1 - low |
| ✓ | SGLT-2i | Dapagliflozin (10 mg) | | HRI 1 - low |
| ✓ | α-glycosidase inhibitor | Acarbose (30 mg) | HEI 0.54 | HRI 1 - low |
| ✓ | . . . | | | |

Case #2 (main hyperglycemia is as PPG):
FBG: 140 mg/dl
PPG: 210 mg/dl
Preprandial glucose: 135 mg/dl, PPG: 210 mg/dl→Glucose excursion: 75 mg/dl Hyperglycemia Prevalence Index=(median FBG−100)/(median PPG−140)=40/70=0.571
Algorithm suggests drugs with a ranking based on comparison between Hyperglycemia Prevalence Index (HPI) and Hyperglycemia Efficacy Index (HEI); Hypo Risk Index (HRI) is also highlighted:

| | | | | |
|---|---|---|---|---|
| ✓ | SGLT-2i | Empagliflozin (10 mg) | HEI 0.56 | HRI 1 - low |
| ✓ | SGLT-2i | Empagliflozin (25 mg) | | HRI 1 - low |
| ✓ | SGLT-2i | Canagliflozin (100 mg) | | HRI 1 - low |
| ✓ | SGLT-2i | Canagliflozin (300 mg) | | HRI 1 - low |
| ✓ | SGLT-2i | Dapagliflozin (10 mg) | | HRI 1 - low |
| ✓ | Biguanide | Metformin (≥1000 mg) | HEI 0.59 | HRI 1 - low |
| ✓ | Glinide | Repaglinide (1.5-12 mg) | HEI 0.62 | HRI 2 - medium |
| ✓ | . . . | | | |

C. Glucose excursion <60 mg/dl in the presence of median FBG−100≥25 mg/dl and median PPG−140≥20 mg/dl→algorithm calculates Hyperglycemia Prevalence Index and suggests to add drugs to current therapy according to their Hyperglycemia Efficacy Index (HEI) as in B.

Case #3 (main hyperglycemia is as FBG)
FBG: 180 mg/dl
PPG: 210 mg/dl
HPI=(median FBG−100)/(median PPG−140)=80/70=1.14 Preprandial glucose: 170 mg/dl, PPG: 210 mg/dl→Glucose excursion: 30 mg/dl Algorithm suggests drugs with a ranking based on comparison between Hyperglycemia Prevalence Index (HPI) and Hyperglycemia Efficacy Index (HEI); Hypo Risk Index (HRI) is also highlighted:

| | | | | |
|---|---|---|---|---|
| ✓ | Glitazone | Pioglitazone (30 mg) | HEI 1.14 | HRI 1 - low |
| ✓ | Glitazone | Pioglitazone (45 mg) | | HRI 1 - low |
| ✓ | Sulphonylurea | Glimepiride (1-8 mg) | HEI 0.69 | HRI 2 - medium |
| ✓ | Sulphonylurea | Gliclazide (80-320 mg) | | HRI 2 - medium |
| ✓ | Sulphonylurea | Gliclazide MR (60-90 mg) | | HRI 2 - medium |
| ✓ | α-glycosidase inhibitor | Acarbose (300 mg) | HEI 0.54 | HRI 1 - low |
| ✓ | ... | | | |

D. Glucose excursion >50 mg/dl in the presence of median PPG−140>50 mg/dl, in an embodiment mean PPG−140>50 mg/dl→algorithm works as in B, but also adds suggestion of prandial insulin to the other drugs to be considered. The software lists prandial or biphasic insulin at the end of the list of other drugs.

E. Median FBG−100≥50 mg/dl, in an embodiment mean FBG−100≥50 mg/dl→algorithm works as in B, but adds also suggestion of basal insulin to the other drugs to be considered. The software lists basal or biphasic insulin at the end of the list of other drugs.

F. Glucose excursion >60 mg/dl in the presence of median FBG−100<25 mg/dl, in an embodiment mean FBG−100<25 mg/dl, and median PPG−140<20 mg/dl, in an embodiment mean PPG−140<20 mg/dl=this situation should not occur in real life!

The invention claimed is:

1. A method for treating an individual suffering from diabetes mellitus, said method comprising the steps of:
   (a) receiving glucose data of said individual at a processing unit, wherein said glucose data comprise at least three fasting glucose measurement values from said individual, and/or at least three matched pre-prandial glucose measurement values and post-prandial glucose measurement values from said individual,
   (b) establishing from a memory one or more of
      (b1) a fasting glucose threshold value,
      (b2) a post-prandial glucose threshold value,
      (b3) a hypoglycemia threshold, and
      (b4) a maximal number of hypoglycemic events to be tolerated,
   (c) carrying out by the processing unit an analysis of the individual's glucose measurements values, said analysis comprising one or more of:
      (c1) determining a first statistical parameter indicative for the deviation between the at least three fasting glucose measurement values and the fasting glucose threshold value,
      (c2) determining a second statistical parameter indicative for the deviation between the at least three post-prandial glucose measurement values and the post-prandial glucose threshold value,
      (c3) determining a Hyperglycemia Prevalence Index (HPI) or a value derived therefrom, wherein the HPI is the ratio of the first statistical parameter as determined in step (c1) to the second statistical parameter as determined in step (c2),
      (c4) determining the number of hypoglycemic events by comparing the individual's fasting glucose measurement values, pre-prandial glucose measurement values and post-prandial glucose measurement values to the hypoglycemia threshold, and
   (d) aiding in the guidance of diabetes drug therapy of said individual, wherein said aiding is carried out by the processor unit and is based on the result(s) of the analysis carried out in step c), and on one or more of the following
      (d1) the effects of at least ten different diabetes drugs on fasting glucose,
      (d2) the effects of the at least ten different diabetes drugs on postprandial glucose,
      (d3) the Hyperglycemia Efficacy Indices of the at least ten drugs, wherein the Hyperglycemia Efficacy Index (HEI) for a drug is the ratio of the effect of said drug on fasting glucose to the effect of said drug on the post-prandial glucose,
      (d4) the risks of causing hypoglycemia of the at least ten diabetes drugs,
      wherein the effects under (d1), (d2), the indices under (d3) and the risks under (d4) are established from a database for said at least ten diabetes drugs from a memory,
         wherein the first and/or second statistical parameter (s) in steps (c1) and/or (c2) being larger than a respective predefined maximum for the first and/or second statistical parameter indicative for a deviation to be tolerated which is established from the memory is indicative for the need to correct hyperglycemia in said individual,
      wherein a number of hypoglycemic events as determined in step (c4) which is larger than a predefined maximal number of hypoglycemic events to be tolerated by the individual which is established from the memory is indicative for the need to avoid hypoglycemia, and
      wherein the aid in the guidance comprises the recommendation to change the current diabetes drug therapy if the analysis in step c) indicates that there is a need to avoid hypoglycemia or to correct hyperglycemia in said individual, wherein the current diabetes drug is one of the at least ten different diabetes drugs, the processing unit further carries out a comparison of the Hyperglycemia Efficacy Index (HEI) of the current diabetes drug and the HEI value of the remaining drugs established from the database of the memory, and a recommended alternative drug for replacement has the most similar HEI value as the current administered drug; or
      wherein the aid in the guidance comprises the recommendation to add a further diabetes drug to the therapy if the analysis in step c) indicates that there is a need to correct hyperglycemia,
      wherein the addition of a diabetes drug out of said at least ten diabetes drugs is recommended which has a HEI value which has the smallest difference to the value of the individual's HPI or the value derived therefrom determined in step (c3); and
   (e) initiating a changed diabetes drug therapy of the individual in response to the guidance.

2. The method of claim 1, wherein the aid in the guidance is provided via a display configured for presenting the aid in the guidance.

3. The method of claim 1, wherein the aiding carried out by the processor unit comprises compiling and ranking more than one alternative diabetes drugs for replacement of the current diabetes drug based on the similarity of their HEI to the HEI of the current diabetes drug.

4. The method of claim 1, wherein the current diabetes drug is one of the at least ten different diabetes drugs, the processing unit further carries out a comparison of the risk of the current diabetes drug of causing hypoglycemia and the risks of causing hypoglycemia for the remaining drugs established from the database of the memory, and a recommended alternative drug for replacement of the current drug is associated with a lower risk of hypoglycemia as compared to the current diabetes drug.

5. The method of claim 1, wherein
  (i) a first statistical parameter as determined in step c1) which is larger than the fasting glucose threshold value, and/or
  (ii) a second statistical parameter as determined in step c2) which is larger than the post-prandial glucose threshold value,
  is indicative for a need to correct hyperglycemia in the individual.

6. The method of claim 1, wherein the processing unit carries out a comparison of the individual's HPI or the value derived therefrom with the Hyperglycemia Efficacy Indices for the at least ten drugs established from the database.

7. The method of claim 1, wherein the aid in the guidance comprises the recommendation to not change the current diabetes drug therapy if the analysis in step c) indicates that there is no need to avoid hypoglycemia and that there is no need to correct hyperglycemia in said individual.

8. The method of claim 1, wherein the method further comprises step a1) of carrying out by the processing unit an analysis of whether sufficient glucose data were received in step a) and wherein the method for aiding in the guidance of diabetes drug therapy is automatically terminated without giving guidance of diabetes drug therapy if the received data were not sufficient.

9. The method of claim 1, wherein the database used in step d) contains information on the risks under (d4) of the at least ten drugs and on at least one of the effects of the at least ten drugs under (d1), the effects of the at least ten drugs under (d2), and the Hyperglycemia Efficacy Indices of the at least ten drugs under (d3).

10. The method of claim 1, wherein the database contains dosage-specific information on one or more or of the effects under (d1), (d2), the Hyperglycemia Efficacy Indices under (d3) and the risks under (d4).

11. The method of claim 1, wherein the method further comprises establishing from a memory information on the costs of the at least ten diabetes drugs, and wherein the aid in the guidance of the diabetes drug therapy is further based on the costs of the at least ten diabetes medicaments.

12. The method of claim 1, wherein information on the guidance made in step d) is automatically transferred to the individual's electronic medical records.

13. The method of claim 1, wherein step (c3) is determining a Hyperglycemia Prevalence Index (HPI), and wherein the addition of a diabetes drug out of said at least ten diabetes drugs is recommended which has a HEI value which has the smallest difference to the value of the individual's HPI determined in step (c3).

14. A computer program product stored on a storage medium and configured to perform the method according to claim 1 during operation on a processing unit.

15. A device for aiding in the guidance of drug diabetes therapy of an individual suffering from diabetes, said device comprising a processing unit, and a computer program including computer-executable instructions, wherein said instructions, when executed by the processing unit, causes the processing unit to perform the computer-implemented method of claim 1.

16. The method of claim 1, wherein step (a) comprises repeatedly conducting tests on a bodily fluid of the individual to obtain the glucose data.

17. The method of claim 2 comprising changing the display to reflect one or more of increasing the dose of the current diabetes drug; adding a further diabetes drug to the therapy of the individual; and, replacing a currently administered drug with an alternative drug.

18. The method of claim 1 in which the initiating comprises the processing unit initiating the changed therapy.

19. The method of claim 1 in which the initiating comprises automatically terminating the drug therapy without giving guidance of diabetes drug therapy.

20. The method of claim 1 in which the initiating comprises automatically terminating the drug therapy without giving guidance of diabetes drug therapy if the received data were not sufficient.

21. The method of claim 1 and further including automatically transferring the information of guidance made in step d) to the individual's electronic medical records.

22. The method of claim 1 and further including automatically issuing electronically a prescription if a change of the diabetes drug therapy of the individual is recommended.

23. The method of claim 2 and further comprising for dose changing displaying a figure representing the dose.

24. The method of claim 2 and changing the dose is performed by changing the figure displayed.

25. The method of claim 2 and further comprising for drug replacement or drug addition displaying a list of recommended drugs.

26. The method of claim 2 and further comprising if the number of glucose measurement values is insufficient, the processing unit displaying an alert message that the number of measurement values is insufficient.

\* \* \* \* \*